United States Patent [19]

Daubenmier et al.

[11] Patent Number: 5,150,297
[45] Date of Patent: Sep. 22, 1992

[54] ELECTRONIC SHIFT CONTROLS FOR A MULTIPLE RATIO TRANSAXLE

[75] Inventors: John A. Daubenmier, Canton; Paul A. Baltusis, Waterford; Ronald T. Cowan, Troy; Joseph E. El-Khoury, Novi; Roy S. Williams, Plymouth, all of Mich.

[73] Assignee: Ford Motor Company, Dearborn, Mich.

[21] Appl. No.: 583,921

[22] Filed: Sep. 17, 1990

[51] Int. Cl.5 ............... B60K 41/06; B60K 41/22
[52] U.S. Cl. .................. 364/424.1; 74/866; 74/867
[58] Field of Search .............. 74/866, 867, 868; 364/424.1

[56] References Cited

U.S. PATENT DOCUMENTS

| | | | |
|---|---|---|---|
| 4,509,389 | 4/1985 | Vahratian et al. | 74/695 |
| 4,633,738 | 1/1987 | Timte | 74/869 |
| 4,665,770 | 5/1987 | Van Selous | 74/733 |
| 4,838,125 | 1/1989 | Hamano et al. | 74/866 |
| 4,875,391 | 10/1989 | Leising et al. | 74/866 |
| 4,932,282 | 6/1990 | Arisumi | 74/867 |
| 4,945,482 | 7/1990 | Nishikawa et al. | 364/424.1 |
| 4,953,091 | 8/1990 | Baltusis et al. | 364/424.1 |
| 4,998,200 | 3/1991 | Glowczewski et al. | 364/424.1 |

Primary Examiner—Parshotam S. Lall
Assistant Examiner—Collin W. Park
Attorney, Agent, or Firm—Roger L. May; Frank G. McKenzie

[57] ABSTRACT

An electronic control system for a multiple ratio automotive transmission having pressure operated clutch and brake servos for controlling ratio changes, solenoid operated valves for triggering operation of shift valves in a valve circuit that communicates with the servos, a microprocessor for developing control signals in response to input variables that measure engine torque, engine speed, vehicle speed and a driver-actuated range selector, the shift valves responding to the control signals in accordance with a control strategy that effects controlled response of the shift valves to meet varying road speed, engine torque and road conditions with high quality shift performance.

31 Claims, 24 Drawing Sheets

| Gear | Cl1 | Cl2 | Cl3 | Cl4 | B1 | B2 | Drive | | Coast | |
|---|---|---|---|---|---|---|---|---|---|---|
| | | | | | | | OWC 1 | OWC 2 | OWC 1 | OWC 2 |
| 1M | X | | X | | | X | X | | | X |
| 1D | X | | | | | X | X | | O/R | |
| 2 | X | X | | | | X | O/R | | O/R | |
| 3 | | X | X | | | | | X | X | |
| 4 | | X | X | | X | | | O/R | | O/R |
| R | X | | | X | | X | X | | | X |

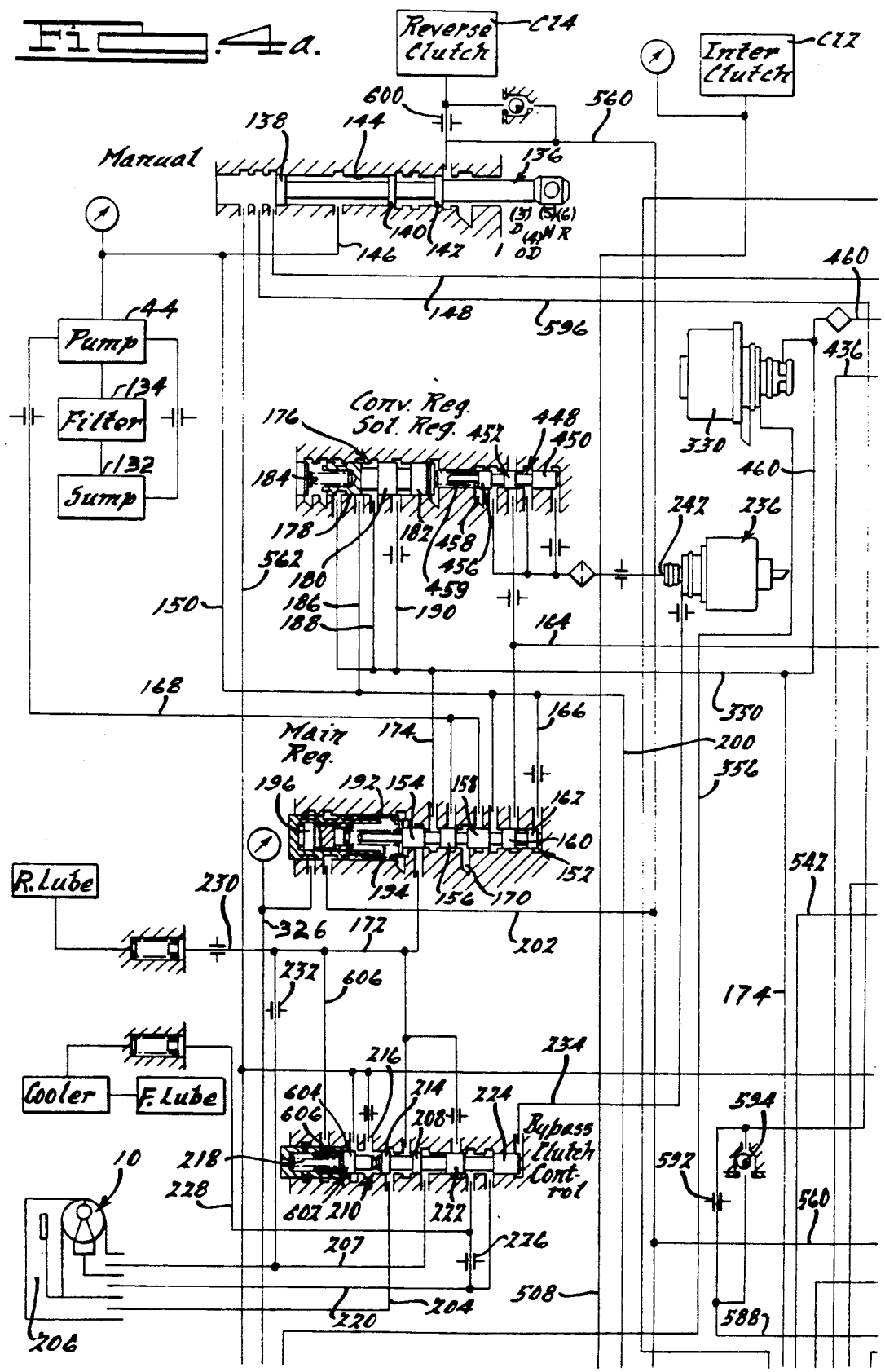

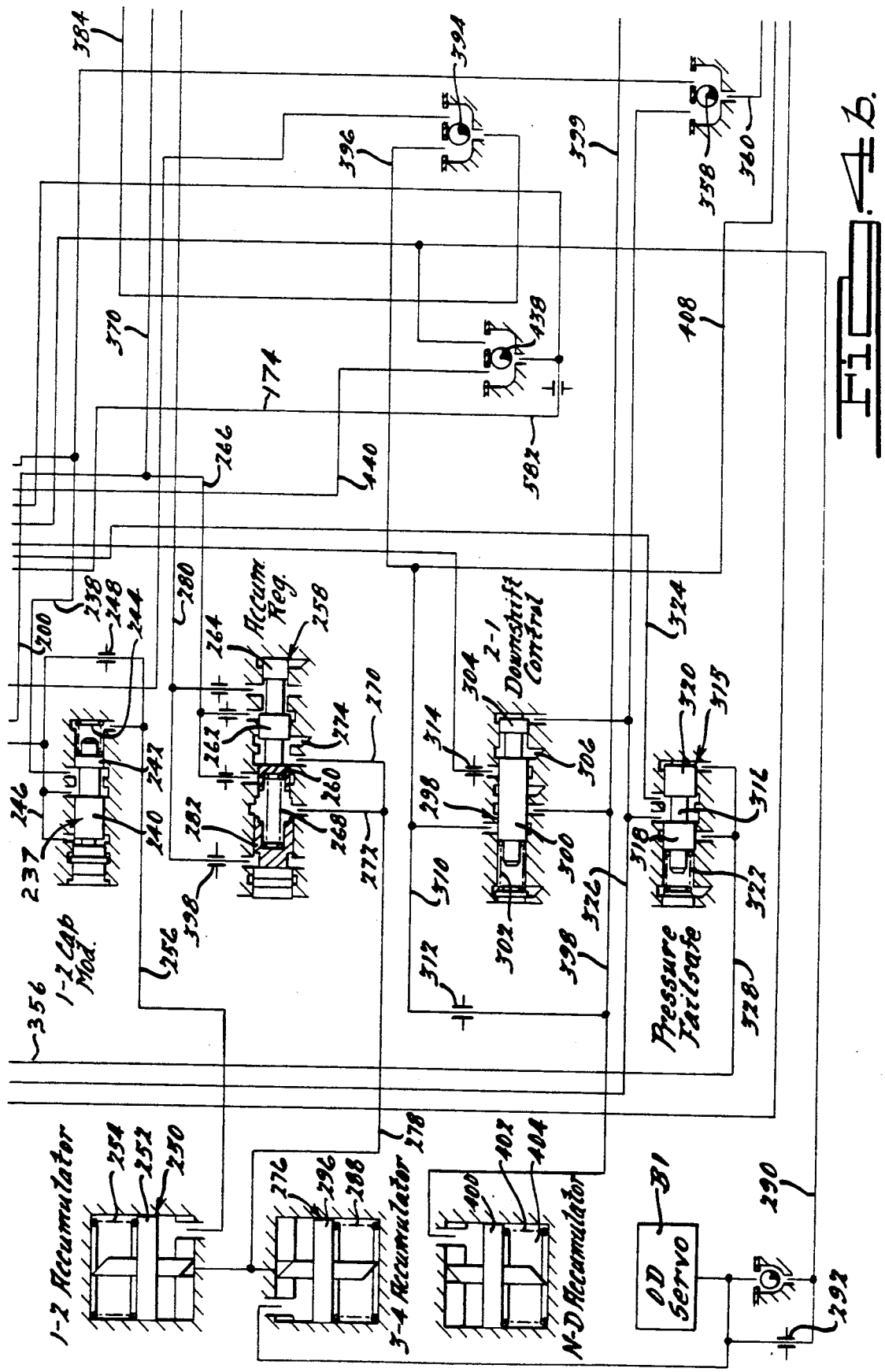

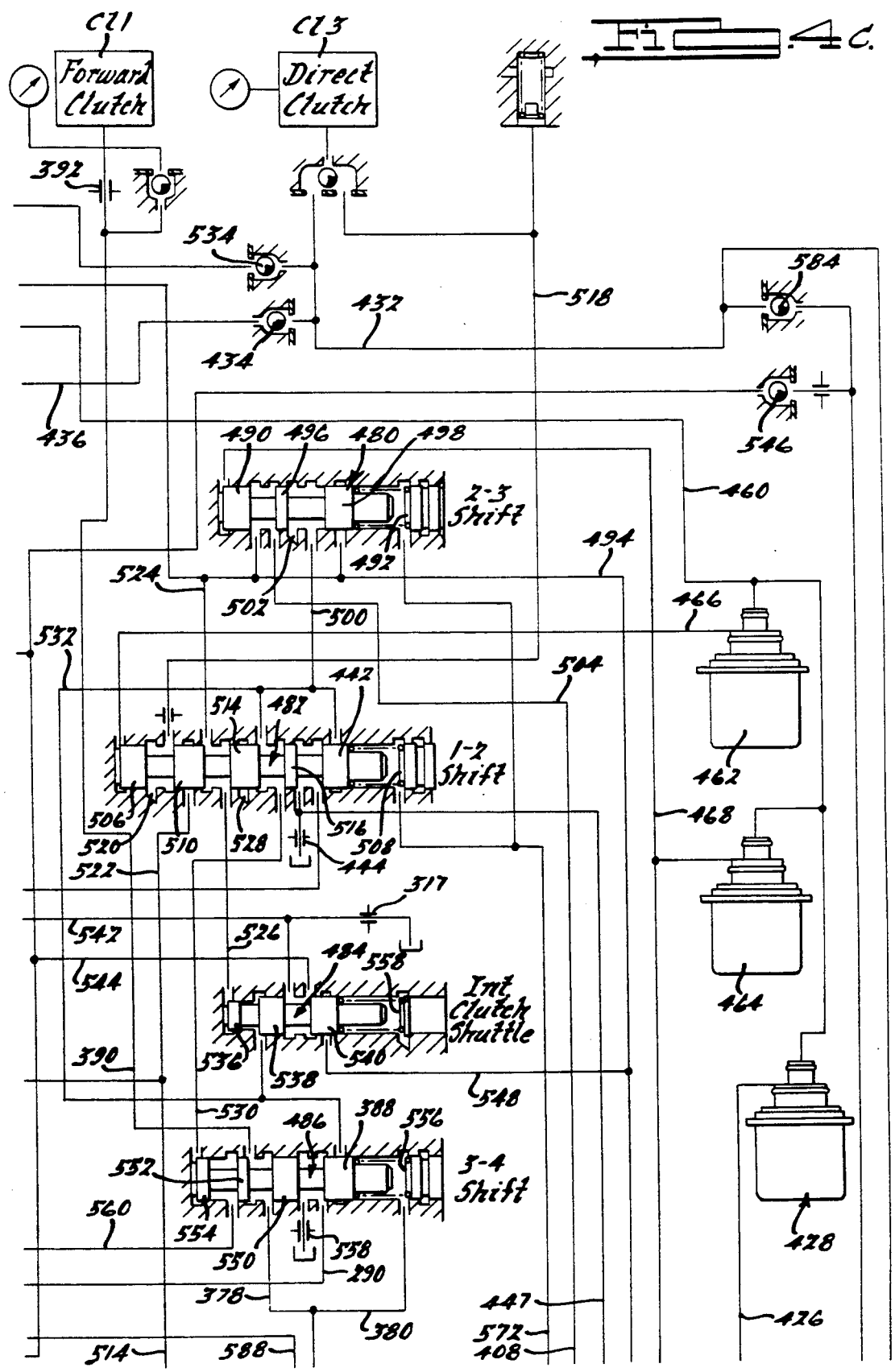

| PRNDL | OD CANCEL | GEAR | ENGINE BRAKING | SS1 | SS2 | SS3 |
|---|---|---|---|---|---|---|
| OD | OFF | 1 | NO | OFF | ON | OFF |
|  | OFF | 2 | YES | ON | ON | OFF |
|  | OFF | 3 | NO | OFF | OFF | ON |
|  | OFF | 4 | YES | ON | OFF | ON |
| 'D' | ON | 1 | NO | OFF | ON | OFF |
|  | ON | 2 | YES | ON | ON | OFF |
|  | ON | 3 | YES | OFF | OFF | OFF |
|  |  | 4 | NOT ALLOWED BY STRATEGY |  |  |  |
| 1 |  | 1 | YES | OFF | ON | — |
|  |  | 2 | YES | OFF | OFF | — |
|  |  | 3 | NOT ALLOWED BY HYDRAULICS |  |  |  |
|  |  | 4 | NOT ALLOWED BY HYDRAULICS |  |  |  |
| R | R |  | NO | — | — | OFF |

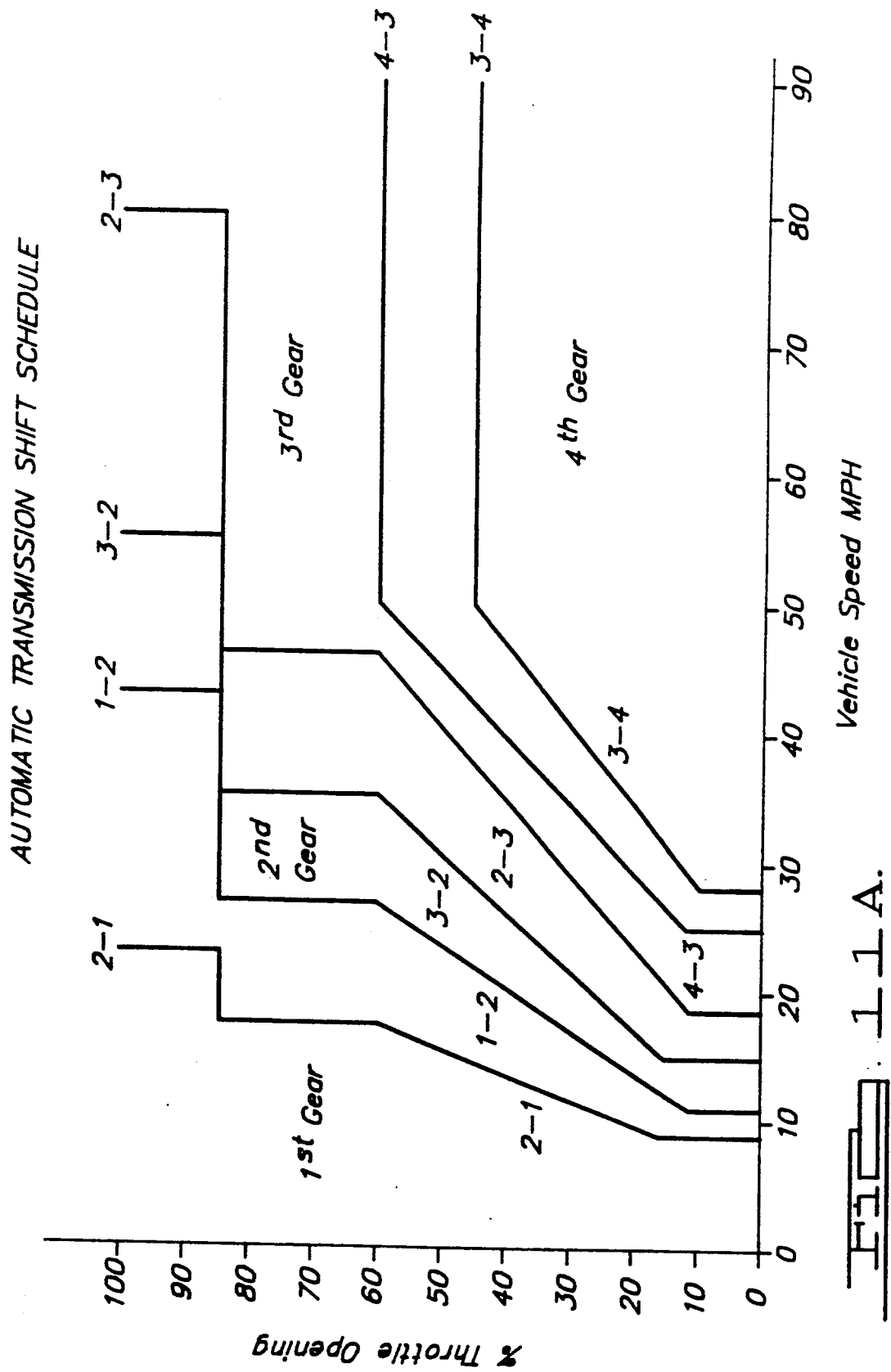

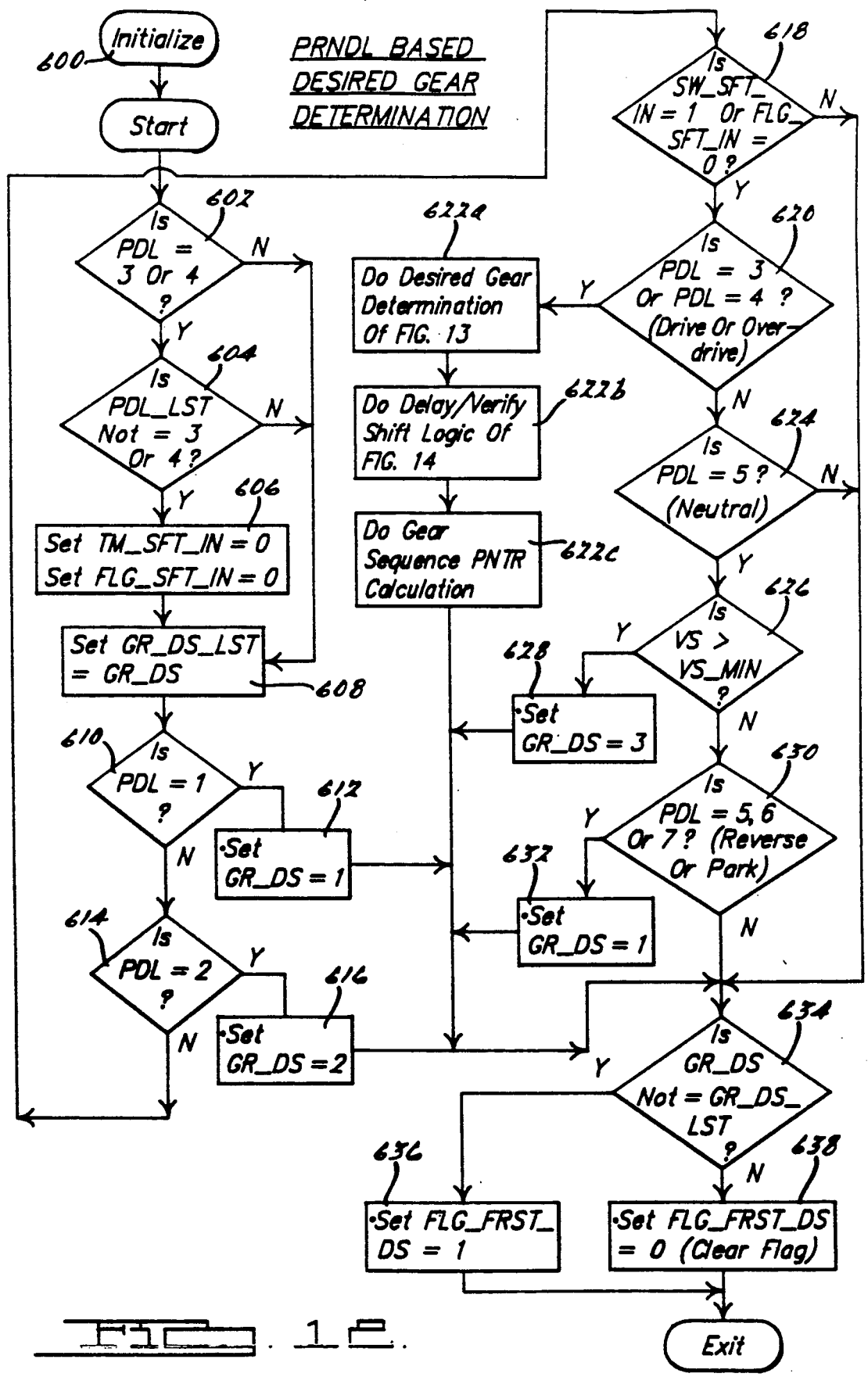

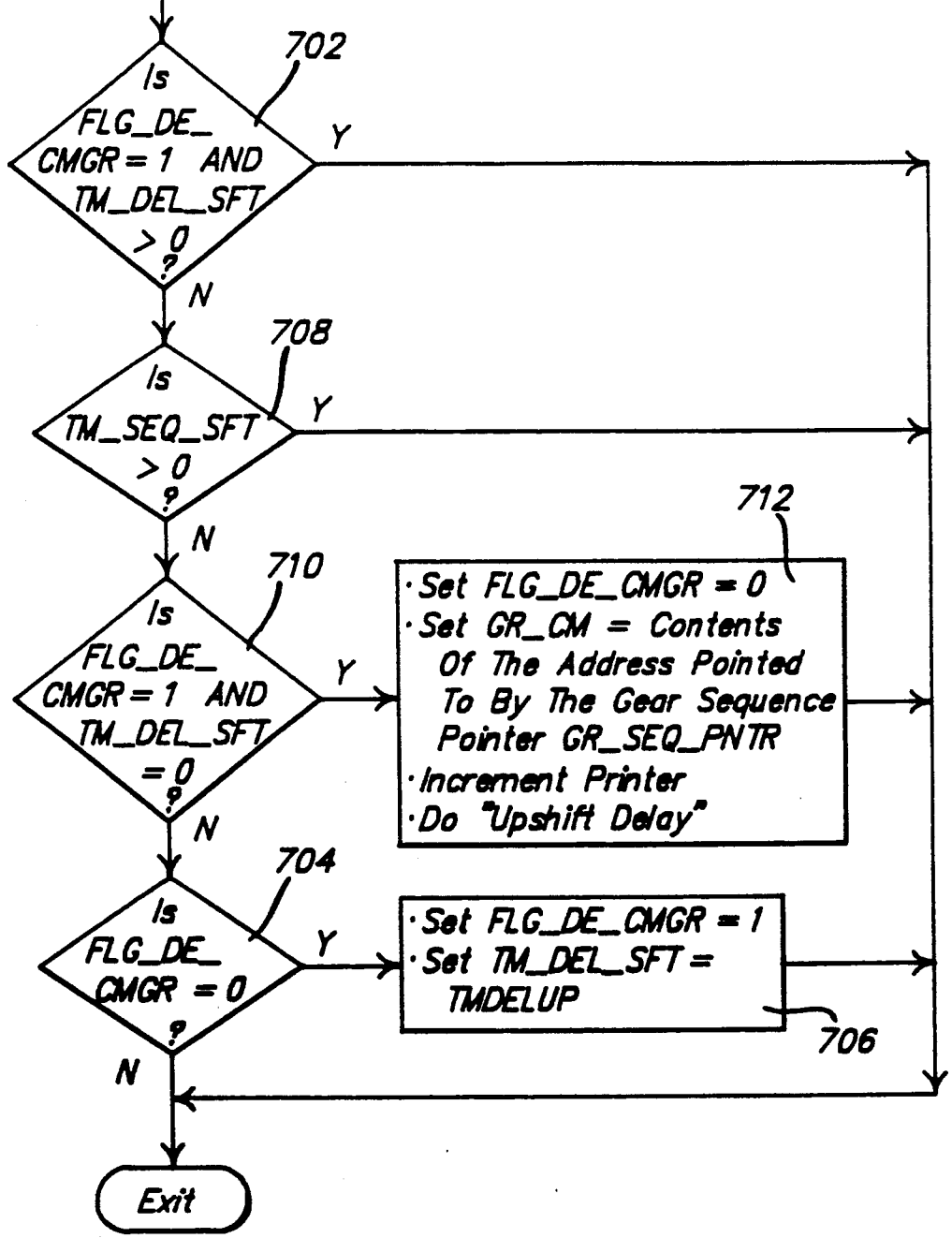

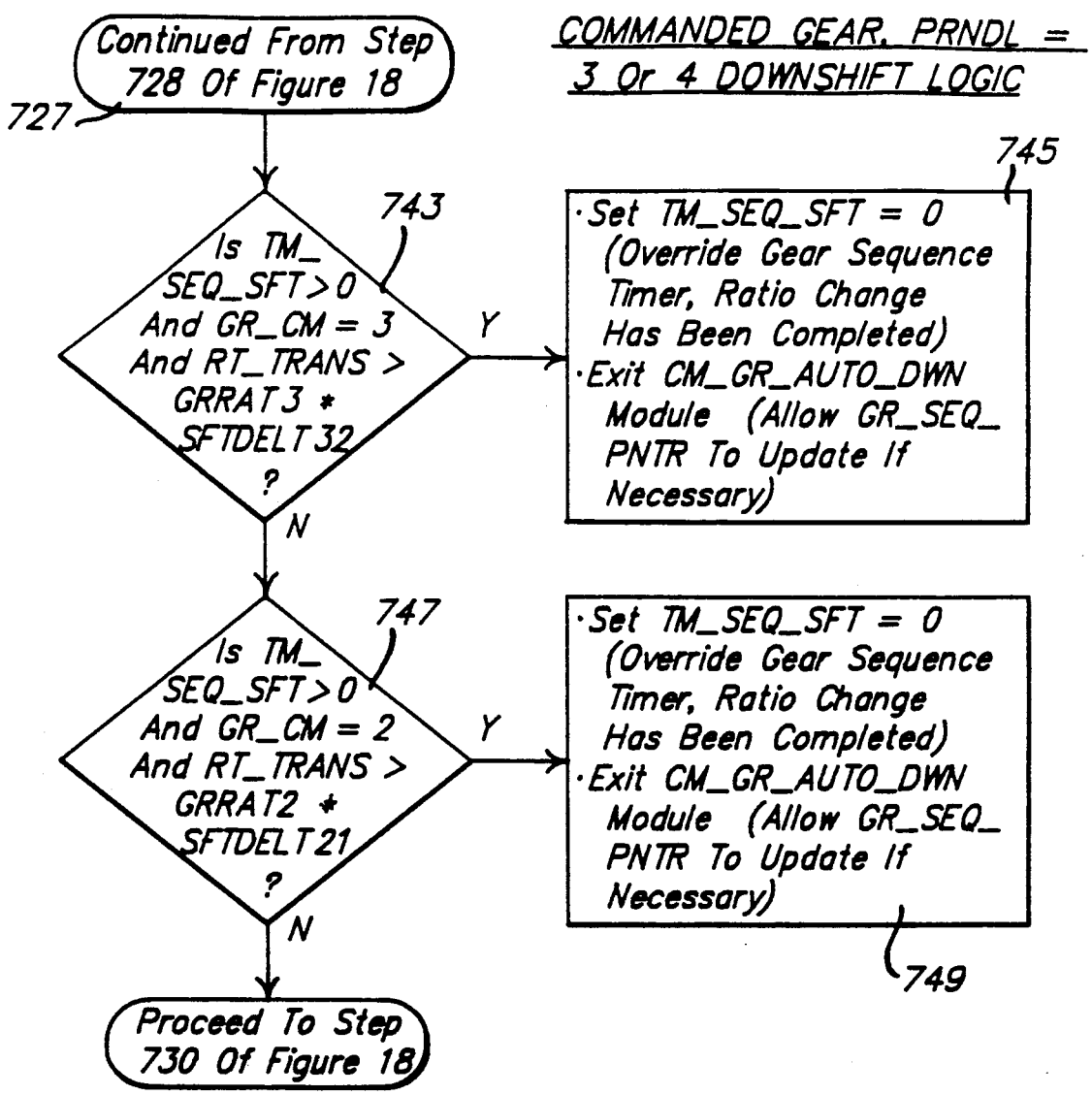

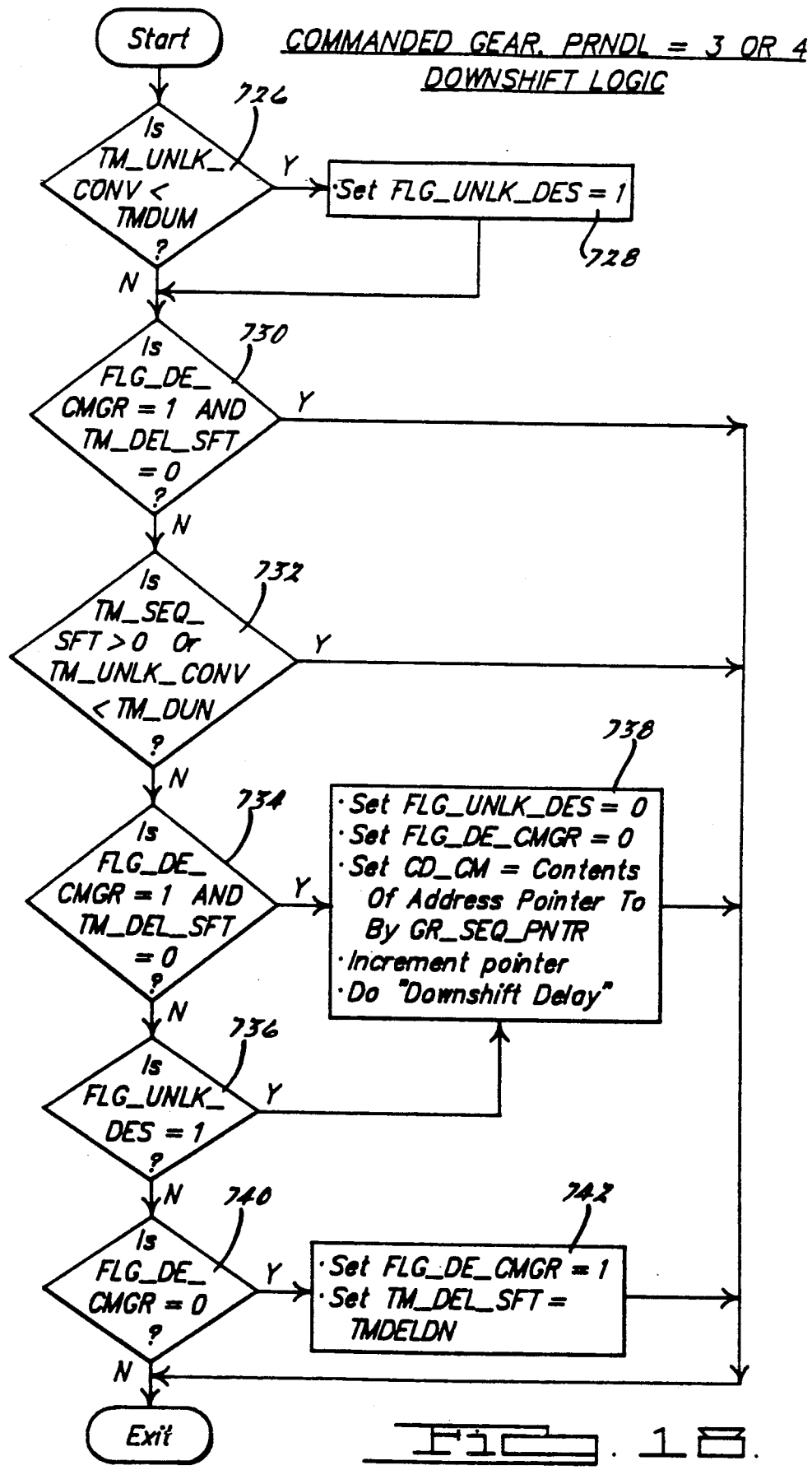

GR_SEQ_PNTR CALCULATION

| Desired Shift | GR_SEQ_PNTR (Pointer Address) | Cal Parameter Description | Possible Choices (Contents) |
|---|---|---|---|
| 1-3 | GR_SE_131 | First Step Of 1-3 Shift | 2 Or 3 |
|  | GR_SE_132 | Second Step Of 1-3 Shift | 3 |
| 1-4 | GR_SE_141 | First Step Of 1-4 Shift | 2 Or 3 Or 4 |
|  | GR_SE_142 | Second Step Of 1-4 Shift | 3 Or 4 |
|  | GR_SE_143 | Third Step Of 1-4 Shift | 4 |
| 2-4 | GR_SE_241 | First Step Of 2-4 Shift | 3 Or 4 |
|  | GR_SE_242 | Second Step Of 2-4 Shift | 4 |
| 3-1 | GR_SE_311 | First Step Of 3-1 Shift | 2 Or 1 |
|  | GR_SE_312 | Second Step Of 3-1 Shift | 1 |
| 4-1 | GR_SE_411 | First Step Of 4-1 Shift | 3 Or 2 Or 1 |
|  | GR_SE_412 | Second Step Of 4-1 Shift | 2 Or 1 |
|  | GR_SE_413 | Third Step Of 4-1 Shift | 1 |
| 4-2 | GR_SE_421 | First Step Of 4-2 Shift | 3 Or 2 |
|  | GR_SE_422 | Second Step Of 4-2 Shift | 2 |

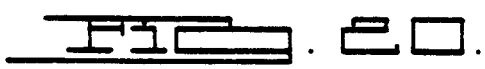

FIG. 20.

3-2 DOWNSHIFT SOLENOID STATES

| Downshift State | Solenoid 462 (SS1) | Solenoid 464 (SS2) | Solenoid 428 (SS3) | Clutch & Brake Response |
|---|---|---|---|---|
| Initial State | OFF | OFF | ON | 3rd Gear |
| 1st State | ON | OFF | OFF | Regulate Low & Int. Servo Apply |
| 2nd State | ON | ON | ON | Orifices 444 & 446 Control Dir. Cl. & LISR |
| 3rd State (Final) | ON | ON | OFF | Orifices 445 & 444 & 430 Control Dir. Cl. & LISR |

TABLE OF FUNCTIONS FOR 3-2 DOWNSHIFT CONTROL

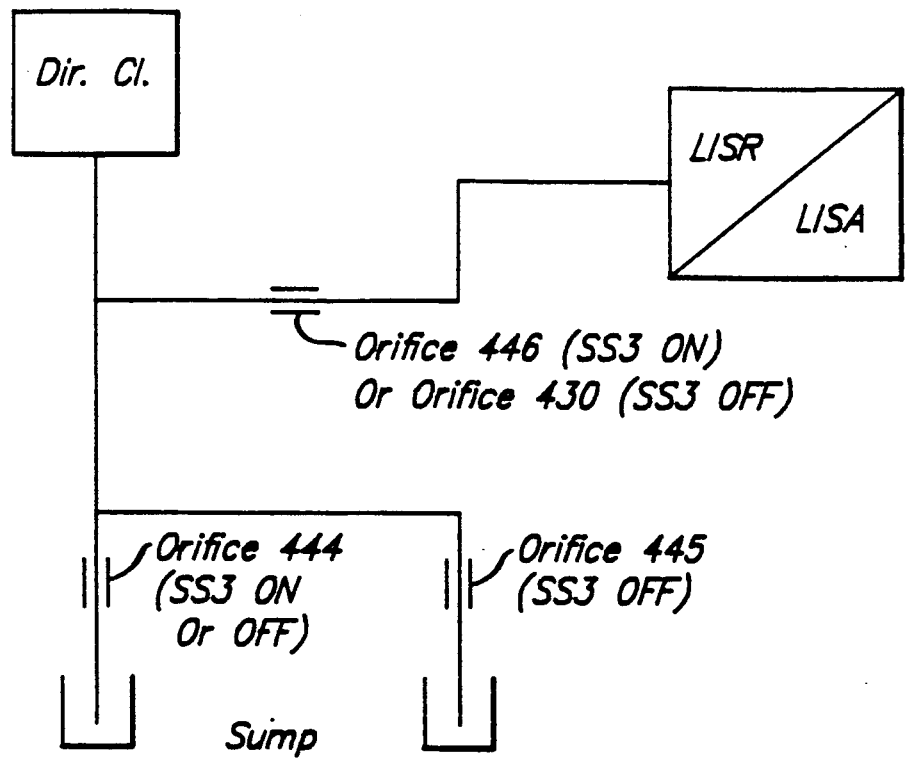

ELECTRONIC SHIFT CONTROLS FOR A MULTIPLE RATIO TRANSAXLE

TECHNICAL FIELD

This invention relates to electronic ratio shift controls for an automatic transmission in an automotive vehicle driveline.

BACKGROUND OF THE INVENTION

A multiple ratio automotive vehicle transaxle of known design, such as the transaxle disclosed in U.S. Pat. No. 4,509,389, comprises a hydrokinetic torque converter and multiple ratio gearing for establishing multiple torque ratio torque flow paths between an engine and axle half shaft of the kind found, for example, in front-wheel drive vehicle powerstrains. The torque converter has a bladed impeller driven by the engine and a bladed turbine adapted to be clutched to torque input elements of the gearing. Such transaxle include fluid pressure operated clutch and blade servos for controlling relative motion of planetary gear elements in the transaxle gearing to establish the multiple torque ratio flow paths. The clutch and brake servos form a part of a hydraulic valve system. Examples of such systems are shown in U.S. Pat. Nos. 4,633,738 and 4,665,770.

Such systems normally include mechanical throttle valve systems that are actuated by engine carburetor throttle controls or engine manifold pressure responsive actuators. They include also timing orifices, separate regulators for regulating, for example, supply pressure for clutch servos and shift inhibitors so that the necessary shift strategy for optimum performance is achieved hydraulically.

The control system of the '738 patent includes a torque converter clutch for establishing a lock-up condition to effect a direct drive from the engine to the converter turbine. The converter clutch, in turn, is controlled by a bypass clutch solenoid valve.

The valve system of the '738 patent, like other known prior art valve systems for multiple ratio transmissions, includes a mechanical governor assembly for developing a signal that is representative of vehicle speed.

GENERAL DESCRIPTION OF THE INVENTION

Our invention is an improvement in valve systems of the kind shown in the '738 patent. It simplifies the valve circuitry and provides necessary time delays in the optimum shift timing and shift quality with minimum reliance on accumulators and flow control orifices. Many of the functions of the valve circuit of the '738 patent are replaced in the improved valve system of the invention by the functions of an electronic microprocessor that controls actuation of a simplified shift valve arrangement. In this way, shift scheduling is achieved principally by the use of electronic microprocessor control logic to provide controlled engagement and release of the clutches and brakes to satisfy driver demands and driving conditions that are imposed on the powertrain. The improved system does not require the use of a hydraulic governor nor a hydraulic, mechanically actuated throttle valve.

The control system includes an integrated central processor which converts signals from a vehicle speed sensor and an engine throttle position sensor as well as other sensors, such as sensors for turbine speed, manual selector lever position and engine speed. The processor converts the vehicle speed and throttle position signals into electrical signals for shift solenoid valves as well as a solenoid valve that controls the converter bypass clutch and a variable force solenoid that develops a so-called throttle pressure that is an indicator of engine torque. The processor receives the sensor signals and operates on them in accordance with a programmed control strategy. The processor includes appropriate gates and driver circuits for delivering the output of the operation of the strategy to the hydraulic control valve body for the transaxle.

The processor includes a central processor unit (CPU) having a memory in which the programmed strategy is stored and a control unit that includes a read/write memory or RAM and internal busses between the memory and the central processor arithmetic logic unit.

The processor executes programs that are obtained from the memory and provides the appropriate control signals to a valve circuit as the input signal conditioning portions of the processor read the input data and the computation logic portions deliver the results of the computation to the output driver system under the program control.

The memory includes both a random access memory (RAM) and a read only memory (ROM) which stores the information that comprises the control logic. The result of the computations carried out on the input data is stored in the RAM where it can be addressed, fetched, erased, rewritten or changed, depending upon the operating conditions of the vehicle.

The CPU portions that perform the computations comprises an integrated circuit distinct from the microprocessor chip that comprises the memory portions. The memory and the CPU computation portions are connected by internal bus and interface circuitry.

Data may be read from a first memory location as the processor seeks an instruction from memory. The fetched data is then fed into a data register or storage area and then to an instruction decoder. When an instruction is to be carried out, the data that is fetched is transferred to an arithmetic logic unit. Then sequentially, pursuant to instructions in the instruction decoder, other data may be fetched from memory and fed into the data registers. The data may be a shift time delay value, for example, and may be stored in an accumulator until it is addressed during sequencing by the processor.

Also sequentially, the data in the accumulator may be transferred to the data register and then fed back into memory and stored in the next memory location of the random access memory where it may be addressed during the next background loop.

The data that is stored in memory may, for example, be shift schedule information or functions in which two variables such as throttle position and vehicle speed are related, one to the other, in accordance with a shift function. The data may also be in the form of information in a table containing three variables or data such as a timer value and values for two other pieces of data or variables such as vehicle speed and engine throttle position.

The control strategy for the transmission is divided into several routines or control modules which are executed sequentially in known fashion during each background pass. The strategy in each sub-module is executed in sequential fashion as the sub-modules are called out by the modules themselves. The various data registers are initialized as input data from the previously mentioned sensors are introduced into the input signal conditioning portion of the processor. The information that results from the inputting of the sensor data, together with information that is stored in memory and learned from a previous background pass, is used to carry out the control functions of the shift solenoid valves, the throttle pressure solenoid valve and the bypass clutch solenoid valve.

There are four main modules in the processor which contain discrete logic functions and data. Each main module has several sub-modules or logic portions that carry out subroutines which will be described subsequently.

The main modules and the sub-modules or logic portions are executed in sequence in each background loop. Each module or logic portion is independent of the others and performs a specific function. They are executed as they are separately addressed by the processor pointer or program counter in the order in which they will be described here. These functions occur after the input signals are received by the input gates and signal conditioning portion of the processor, and after the input signal conditioning has occurred.

The four main modules are the PRNDL-Based Desired Gear Determination module, the PRNDL-Based Commanded Gear Determination module, the Load Shift In Progress Timer module, and the Determined Shift Solenoid States module.

The PRNDL-Based Desired Gear Determination module is divided into three sub-modules called the GR_DS_PRNDL=3 or 4 sub-module, GR_SEQ_PNTR calculation sub-module, and the Delay Verify Shift sub-module.

The second main module, namely, the PRNDL-Based Command Gear Determination module, has four sub-modules which are identified as the GG_CM,PRNDL=1 Logic sub-module, the GR_CM,PRNDL=2 Logic sub-module, GR_CM,PRNDL=3 or 4 Upshift Logic sub-module, and the GR_CM,PRNDL=3 or 4 Downshift Logic sub-module.

The PRNDL-Based Desired Gear Determination module determines the gear that the transmission should assume to satisfy a given set of steady state operating conditions. For example, it will choose the appropriate gear or the desired gear for certain throttle openings and vehicle speeds and for a given road load, but it will change if any of the prevailing conditions should change. If the selector and lever PRNDL position is manual 1, the desired gear is set to 1.

If the manual lever PRNDL is in neutral, the desired gear is set to 3 when the vehicle is coasting at a relatively high speed. This will avoid harshness if the manual lever is subsequently moved to the drive position during such a coasting maneuver. On the other hand, if the vehicle speed is low or the vehicle is stopped when the transmission is shifted to neutral, the desired gear is 1 and the output of this module then will be 1. This sets the shift solenoids to the appropriate states to achieve that gear ratio.

If the manual lever is placed in the overdrive position or the 3 position (overdrive cancel), then sub-module GR_DS,PRNDL=3 or 4, the GR_SEQ_PNTR calculation sub-module, and the Delay Verify Shift sub-module are executed. If a vehicle shift currently is taking place, the sequence will not be executed until a shift in progress flag is cleared.

The sub-module GR_DS_PRNDL=3 or 4 has a sub-routine that selects the desired gear using stored information based upon vehicle speed and throttle position. The desired gear is set to the next higher gear if the engine speed is greater than the sea level wide-open throttle engine upshift speed for the current gear.

The next module is the Delay Verify Shift Module. If a change occurs in the desired gear, this module will delay a change to that gear until a new desired gear has been present a sufficient length of time to verify that a shift is appropriate. For example, if the shift is the result of a transient condition that begins and ends during a time less than the time required for a delay timer to expire, a change in desired gear will not occur. Further, the delay will permit the new desired gear to be delayed by a time that is determined by a sub-module called "Load TM_VER_SFT for Upshifts", which determines the delay time required to verify that an upshift should be made. If a fast "backout" rate is detected this routine, for example, the time required to verify a tip-out upshift is used. Otherwise, the time required to verify a normal upshift is used.

Next, the processor addresses the module called $GR_{13}SEQ_{13}PNTR$ which carries out a gear sequence calculation. This module determines how multi-step shifts will be sequenced based upon a series of calibration parameters. Each step of every multi-step shift has a calibration parameter that is unique to it. For example, if the current gear is 1 and the desired gear is 4, a 1-4 upshift is called for. There are three calibration parameters; namely, $GR_{13}SEQ_{13}141$, $GR_{13}SEQ_{13}142$, and $GR_{13}SEQ_{13}143$ to determine which gear to command during each step of the shift. This will result in a 1-2-3-4 shift, a 1-3-4 shift, or a 1-4shift.

The next main routine is carried out by the PRNDL-Based Commanded Gear Determination module which determines which gear should be commanded. If the range selector (PRNDL) is in the manual low position, the GR_CM,PRNDL=1 logic is executed. If the PRNDL is in 3 or 4 and an upshift is desired, the GR_CM,PRNDL=3 or 4 upshift control logic is executed. If the manual lever PRNDL is n 3 or 4 and a downshift is desired, GR_CM,PRNDL=3 or 4 downshift logic is performed. If PRNDL is in neutral and vehicle speed is high, the commanded gear is set to 3, as explained previously. Otherwise, the PRNDL, when in neutral, commands the gear to be set at 1.

The GR_CM,PRNDL=1 module (Gear Command) determines the commanded gear when the range selector (PRNDL) is in manual low. Downshifts are scheduled based upon vehicle speed, and no upshifts are allowed. The downshifts are sequenced with a minimum amount of time spent in each gear, and those times are determined by calibratable sequence timers. If manual low is selected, for example, and the vehicle speed is low, the shift will be sequenced through the third and second gears from the fourth gear as the transmission is conditioned for operation in the first gear. A unique calibratable sequence time is used for each step of such a multiple-step downshift.

The next sub-module that is executed in this routine is the GR_CM, PRNDL=3 or 4 upshift module (Gear Command). This sub-module determines the commanded gear when the range selector (PRNDL) is in 3 or 4 and an upshift is desired. If a single step upshift is desired, the commanded gear is set to the desired gear.

If a multi-step upshift is desired, the commanded gear is set to the first step of the multiple ratio shift, as determined by the calculation of the GR_SEQ_PNTR calculation sequence. Again, shifts from one step to another are delayed by the sequence time determined by the upshift delay logic.

The upshift delay logic is a routine executed by the sub-module that determines the time that should be spend in each gear before the next step of a multiple step upshift can be executed. If an upshift from the second gear to the third gear is desired, the sequence time for that shift must expire before the upshift can be completed. If the current gear is 3, the sequence timer is set to a new value before the execution of the 3-4 shift can be completed.

Following completion of the logic steps for an upshift, the GR_CM,PRNDL=3 or 4 Downshift (Gear Command) module will address the downshift delay logic and will execute it if it is called for. This module determines the time that must be spend in each gear before the next step of a multi-step downshift can be executed. In this respect, its function is similar to the upshift delay logic function described previously. If the current gear is 3, the sequence timer is set to the sequence time before the execution of the 3-2 shift. If the current gear is 2, the sequence timer is set to the sequence time before the execution of the 2-1 shift.

Each time a new gear is commanded, the Load Shift In Progress Timer module loads a unique time into the shift in progress timer. Calibration constants are provided for power-on upshifts, power-off upshifts, power-on downshifts, power-off manual downshifts, and power-off automatic downshifts. This timer must count down to zero before the PRNDL-Based Desired Gear Determination module will begin its execution for a new desired gear while the range selector (PRNDL) is in 3 or 4.

If the transmission has been in park or neutral, the 3-2 downshift and the shift solenoid states are determined by the 3-2 downshift control logic. Otherwise, during normal operation, the shift solenoid state are set according to the commanded gear and the range selection (PRNDL) position. If conditions call for execution of the 3-2 downshift control logic, the Determine Shift Solenoid States module will control the shift solenoid state during a 3-2 downshift. For power-on 3-2 downshifts, the delay is determined as a function of the input of vehicle speed and throttle position. This delay is obtained from a table stored in memory. If the 3-2 downshift is a power-off downshift, a separate power-off 3-2 control logic is executed as it controls the states of the shift solenoids.

A general description of the shift logic for normal upshifts now will be made. That will be followed by a general description of the shift logic for normal downshifts. These are examples of how the control logic will react to various changes in the operating conditions that are encountered during a typical driving maneuver with the manual range selector valve (PRNDL) in 3 or 4.

Normal Upshifts When Manual Lever (PRNDL)=3 Or 4

A check is made by the processor for an appropriate vehicle speed controlled upshift. All schedules for upshifts into the higher ratios are checked and the desired gear is set to the highest gear that is allowed by the shift schedules. If the vehicle speed is higher than the upshift function for throttle position corrected for altitude and other variables, then an upshift is commanded.

Delay/Verify Shift Logic

The new desired gear is not allowed to pass through to the commanded gear module until the upshift timer has run down. When the new desired gear is passed through to the PRNDL-Based Commanded Gear Determination module, the $GR_{13}CM, PRNDL = 3$ or 4 logic is executed. In that case, if this is the first execution of the logic, the commanded gear is set to the desired gear. If this is a single step shift, that logic then is finished. If it is a multiple-step shift, a new sequence timer is loaded to effect a shift delay time for that part of the multiples-step shift. Similar delay times are introduced for each other step of the multiple-step shift. When all of the delays are completed, the commanded gear is set to the gear for the final step of the shift.

$GR_{13}SEQ_{13}PNTR$ Calculation

If the desired gear is one greater than the current gear, a single-step shift is desired. If it is more than one greater than the current gear, a multiple-step shift is desired. This calculation will determine the first step of the shift. If the shift is a tip-out shift, which results from a quick relaxation of the engine throttle, the new desired gear value is not allowed to pass through to the commanded gear module until the tip-out upshift verification time has passed. Thus, a timer will prevent continuation of the logic until the tip-out upshift verification time has elapsed.

If the upshift desired is not a tip-out upshift, the new desired gear is not passed to the commanded gear module until the upshift verification timer for that upshift has expired. When that occurs and the shift delay is over, the commanded gear is set to the gear for the second step of a multiple-step shift. If still another step is required to complete the shift sequence, the shift sequence timer for the next step is loaded and a second delay, independent of the first, delays the next step. When that shift sequence time is expired, the commanded gear is set to the gear for the final step of the multiple-step shift.

Normal Downshifts PRNDL=3 Or 4

If there is no shift in progress, then a check is made to see if there is a new desired gear. The processor checks all schedules for downshifts into lower gears and sets the desired gear to the lowest gear allowed by the shift schedules. As in the case of upshifts, if the desired gear is one less than the current gear, the commanded gear is set to that desired gear. If the desired gear is more than one less than the current gear, the $GR_{13}SEQ_{13}PNTR$ calculation determines the first step of the shift. Each step of the shift has an independent calibration constant.

Determine Shift Solenoid States

If the downshift is a 3-2 downshift, this logic will control the feel of a 3-2 downshift by timing the movement of the 1-2shift valve and the 2-3 shift valve, thus determining the timing of the exhaust of the direct clutch and the application of the low-and-intermediate brake band. If the downshift is a power-off 3-2 downshift, the sequence times are different than in the case of a power-on 3-2 downshift, the latter sequence times being read from a 3-2 downshift table containing the functional relationship between the timer value, vehicle speed and throttle position. The table contains timer values for various throttle positions and for various vehicle speeds. If the time that is read from the table is at a first value, the shift solenoids are actuated in a first operating sequence to effect a ratio change to second gear. If the time read from the table is at a different value, the shift solenoids are actuated in a second operating sequence and a different calibrated time elapses before a ratio change to second gear operation occurs.

BRIEF DESCRIPTION OF THE DRAWINGS

FIGS. 4a, 4b, 4c and 4d show a hydraulic valve system that responds to the control signals developed by the microprocessor of FIG. 3a.

FIG. 11A is a chart that shows the shift points for upshifts and downshifts between the four driving ratios that are represented in FIGS. 1 and 2, the upshift points and the downshift points being functions of throttle position and vehicle speed.

FIG. 12 is a flow chart of the control strategy for the PRNDL-Based Desired Gear Determination module.

FIGS. 15A and 16 show a flow chart of the control strategy for the Commanded Gear, PRNDL=3 or 4 Upshift Logic module.

FIGS. 17A and 18 show a flow chart of the control strategy for the Commanded Gear, PRNDL=3 or 4 downshift logic.

FIG. 20 is a table showing the various gear shift ratio sequences that are addressed by the gear sequence pointer.

FIG. 22 is a diagram showing the orifices that are functional during various 3-2 downshift conditions as fluid flow from the direct clutch and the release side of the intermediate servo is controlled.

PARTICULAR DESCRIPTION OF THE INVENTION

Transaxle

Figures 1, 2:
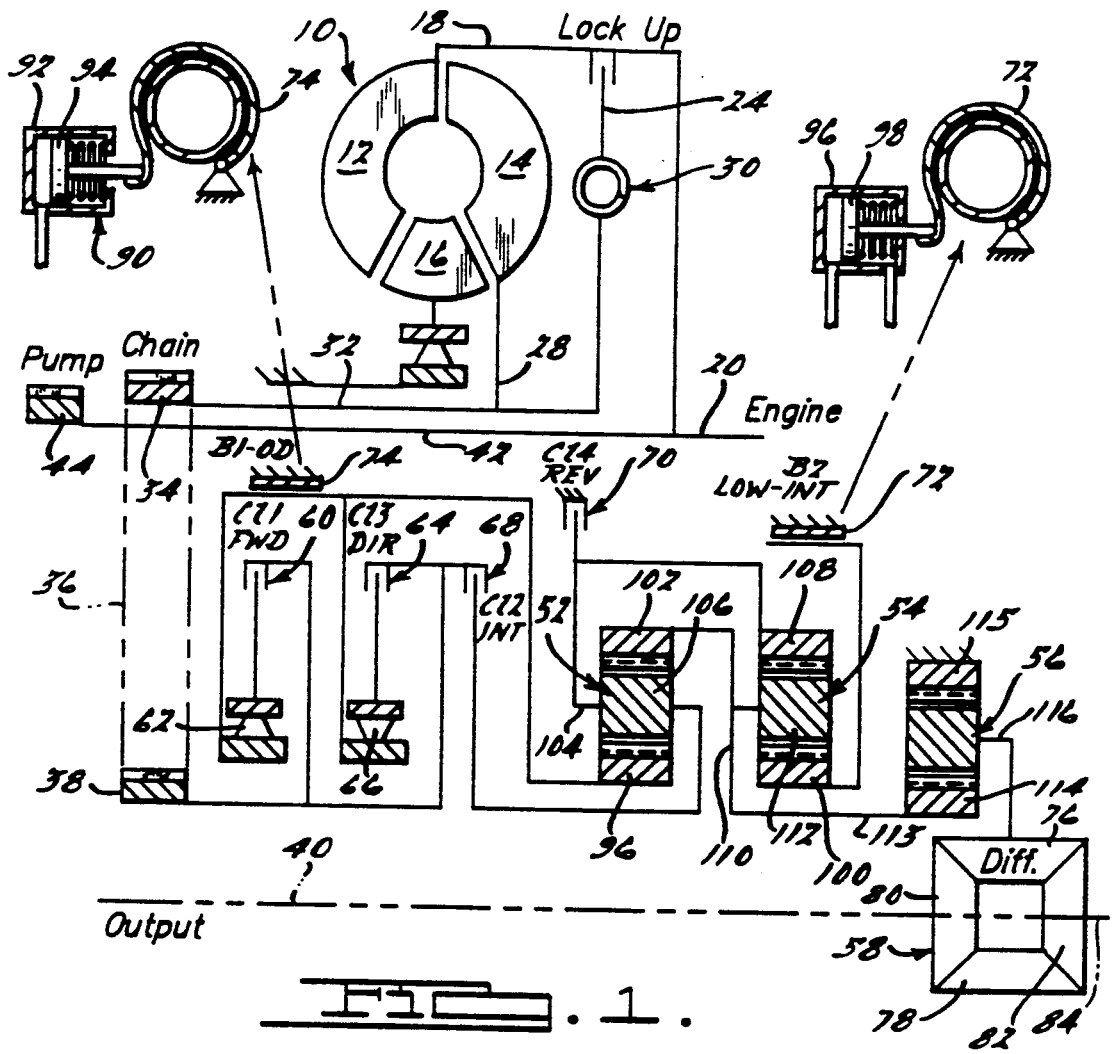
FIG. 1 is a schematic representation of a transaxle, torque converter and gearing arrangement capable of embodying the improved control system of our invention.
FIG. 2 is a chart that shows the clutch and brake engagement and release pattern for the clutches and brakes of the transaxle of FIG. 1 during ratio changes.

Shown in FIG. 1 is a schematic cross-sectional view of the torque converter and planetary gearing of a transaxle capable of being controlled by the control system of this invention. The transaxle includes a torque converter 10 having a bladed impeller 12, a bladed turbine 14 and a bladed stator 16 arranged in a toroidal fluid flow circuit. The impeller 14 includes an impeller housing 18 which is connected drivably to an engine crankshaft 20 by means of a drive plate 22.

A bypass clutch assembly 24 is situated in the impeller housing 18 and is adapted to establish a mechanical torque flow path between the impeller and the turbine. The bypass clutch 24 includes a clutch plate 26 having an annular friction surface at an outward radial location which engages a friction surface on an outward radial portion of the impeller housing 18. Clutch plate 26 is connected to the hub 28 of the turbine 14 by means of a torsional damper assembly 30. A turbine sleeve shaft 32 is connected drivably to a driving sprocket 34 of a torque transfer chain drive, which includes a drive chain 36 and a driven sprocket 38 located on the axis of a torque output shaft 40.

The impeller housing 18 is connected drivably by means of central shaft 42 to a positive displacement gear pump 44 which serves as a fluid pressure source for the control system. The control valve system is located in a valve body secured to a housing portion enclosing the chain transfer drive.

The planetary gear units for the transaxle comprises a first simple planetary gear unit 52 and a second simple planetary gear unit 54. A final drive gear unit 56 is located on the torque output side of the planetary gear units between the gear units and a differential gear assembly 58.

The speed ratios achieved by the two simple planetary gear units are controlled by a forward clutch 60 and a low ratio overrunning coupling 62, a direct clutch 64, a direct overrunning coupling 66, an intermediate clutch 68, and a reverse clutch 70. In addition to the clutches and the overrunning coupling, there are two friction brakes comprising low-and-intermediate brake bands 72 and overdrive brake band 74.

The differential gear assembly 58 includes differential pinions 76 and 78, which mesh with differential side gears 80 and 82. Side gear 80 is splined to one end of output shaft 40, and side gear 82 is splined in a companion output shaft 84. Universal joint assemblies connect the shafts 40 and 84, respectively, to axle half shafts for each of the vehicle traction wheels.

A fluid pressure operated brake servo applies and releases overdrive brake band 74. That servo comprises a cylinder and servo piston that define a pressure chamber which, when pressurized, applies brake band 74, thereby anchoring sun gear 96 for the planetary gear unit 52.

Low-and-intermediate brake bank 72 is applied and released by a brake servo comprising a cylinder and a double-acting piston located within the cylinder. The piston 98 and cylinder 96 define a pair of opposed pressure chambers. When both chambers are pressurized, brake band 72 is released. When the pressure chamber on one side of the piston 98 is pressurized, the pressure chamber on the other side of the piston is exhausted and the piston is stroked, thereby engaging the brake band 72, thus anchoring sun gear 100 for gear unit 54.

Gear unit 52 comprises, in addition to the sun gear 96, a ring gear 102, a carrier 104, and planet pinions 106 journalled on the carrier 104. Pinions 106 mesh with ring gear 102 and sun gear 96.

Gear unit 54 comprises, in addition to sun gear 100, ring gear 108, carrier 110 and planet pinions 112 journalled on the carrier 110.

Ring gear 102 of the gear unit 52 is connected drivably to carrier 110 which, in turn, is connected to output shaft 113 which delivers torque directly to sun gear 114 of the final drive gear unit 56. Ring gear 115 of the gear unit 56 is connected to and anchored by the transmission housing. Carrier 116 of gear unit 56 is connected directly to the differential housing which supports the pinion shaft on which the pinions 76, 78 are journalled.

The forward clutch 60, the direct clutch 64, the intermediate clutch 68 and the reverse brake 70 are actuated by their respective servo pistons which are received in servo cylinders and which define with the cylinders pressure working chambers that energize multiple friction discs. In each instance, a piston return spring acts on the piston to oppose the fluid pressure force of the working pressure.

The chart of FIG. 2 shows the clutch and brake engagement and release pattern for the clutches and brakes illustrated schematically in FIG. 1. For purposes of correlating the schematic representation of FIG. 1 with the chart of FIG. 2, the forward clutch is identified in FIG. 2 by the symbol CL1, the direct clutch 64 is identified in FIG. 2 by the symbol CL3, the intermediate clutch 68 is identified in FIG. 2 by the symbol CL2, the reverse brake 70 is identified in FIG. 2 by the symbol CL4, the low-and-intermediate brake band 72 is identified in FIG. 2 by the symbol B2, and the overdrive brake band 74 is identified in FIG. 2 by the symbol B1. Further, the forward overrunning coupling 62 is identified in FIG. 2 by the symbol OWC1, and the direct overrunning coupling 66 is identified in FIG. 2 by the symbol OWC2.

The gear ratios that may be obtained with the gearing of FIG. 1 are listed in the left-hand vertical column of FIG. 2. The corresponding clutch or brake that is applied to achieve any given gear ratio is identified in FIG. 2 by the symbol X. In the case of the overrunning couplings, the engaged state of the overrunning coupling is identified in FIG. 2 by the symbol X; and the overrunning state is identified by the symbol OR, which is an overrunning condition.

The various drive ranges that may be obtained for the transmission structure of FIG. 1 are determined by the position of a manual valve, which will be described with reference to FIG. 4a.

To obtain the low-speed driving ratio, clutch CL1 is applied, as indicated in FIG. 2. If coast braking is desired at low ratio, direct clutch C13 is applied. On the other hand, if the transmission is conditioned for the normal drive model with a full range of ratios, clutch CL3 is not applied and no braking torque is available since overrunning coupling OWC2 transmit torque reaction in only one direction.

Low-and-intermediate brake band B2 is applied in low ratio, thereby anchoring sun gear 100 which serves as a reaction point. The torque on the driven sprocket 38 thus is transferred through the forward clutch CL1 to the sun gear 96. A split torque delivery path, therefore, occurs through gear unit 52 as the carrier 104 drives a ring gear 108 which, in turn, delivers torque to the carrier 110 and the output shaft 112.

A ratio change from the low speed ratio to the intermediate speed ratio is achieved by engaging clutch CL2. This cause overrunning coupling OWC1 to free wheel as torque is transferred through the engaged clutch 68 to the carrier 104. A ratio change from the intermediate ratio to the direct drive ratio is achieved by engaging clutch CL2 as clutch CL1 is released. Clutch CL3 remains applied so all of the elements of the gear units rotate together in unison with a one-to-one ratio.

Overdrive ratio is achieved by continuing to release clutch CL3, by continuing to apply clutch CL2, and by continuing to apply clutch CL3 as the overdrive brake band B1 is applied. Since the sun gear 96 is anchored by the overdrive brake band, the ring gear 102 and the output shaft 112 are overdriven. Overrunning coupling OWC2 freewheels during overdrive.

Reverse drive is achieved by engaging simultaneously clutch CL1 and reverse brake CL4. Clutches CL2, CL3, and brake B1 are released. Torque of the driven sprocket 38 then is transferred through clutch CL1 and the overrunning coupling OWC1 to the sun gear 96. Since carrier 104 is anchored by the reverse brake CL4, ring gear 102 is driven in a reverse direction together with output shaft 112.

The Control Valve Circuit Of Figures 4a and 4b

The drive shaft 42, which extends through the torque converter 10 drives the pump rotor 118.

As the rotor is driven, pump vanes rotate within the pump cavity, thereby developing a fluid pressure in known fashion. Fluid is applied to the intake ports for the pumps 44 from sump 132 through filter 134.

Fluid is supplied from the pump to manual valve 136 shown in FIG. 4a. This valve comprises a valve spool with spaced lands 138, 140 and 142 which register with internal valve lands in manual valve bore 144. The manual valve, in known fashion, may be adjusted by the vehicle operator to any drive range position. In the embodiment disclosed in this specification, the positions are driven range D, which provides for three forward driving ratios; and overdrive position OD, which conditions the transmission for operation in each of four forward driving ratios including an overdrive; a manual low position; a neutral position N and a reverse drive position R. In the position shown in FIG. 4a, manual valve 136 distributed pressure from pump supply passage 146 to passage 148 which is pressurized during operation of overdrive OD and drive range D.

The manual valve also supplies passage 150, which leads to main regulator valve spool 152. Regulator valve spool 152 comprises lands 154, 156, 158, 160 and 162. The first three lands are of equal diameter, but land 162 has a smaller diameter. This permits line pressure from passage 164 to the distributed to the differential area of lands 160, 162 during operation in the second, third and fourth ratios following an upshift from the first ratio. Pump pressure passage 150 supplies the valve chamber for the valve spool 152 at a location intermediate lands 158, 160. The feedback passage 164, including a control orifice, provides for a pressure regulating feedback pressure.

An output pressure passage 168 communicates with ports that register with lands 156 and 158, and exhaust port 170 is located between the lands 156 and 158. A regulated converter pressure in passage 174 communicates with passage 172 when land 154 uncovers passage 172.

Passage 174 is supplied with pressure from converter regulator valve assembly 176. This valve assembly comprises pressure regulating valve lands 178, 180, and 182 which are spring loaded in a right-hand direction by valve spring 184. Pump pressure is supplied to the converter regulator valve through passage 186. Passage 188 feeds passage 174 described previously as converter regulator valve assembly 176 modulates the pressure in passage 186, with passage 190 being a feedback passage.

The main regulator valve assembly includes valve spring 192 and 194. A TV booster valve element 196 provides an anchor for the spring 194. When throttle valve pressure is admitted to the left side of the valve element 196, the fluid pressure force is transmitted to the valve 152 through the spring.

The presence of a throttle valve pressure on the valve element 196 will cause an increase in the spring force of spring 194, thereby increasing the regulated line pressure made available to line pressure passage 200. During operation in reverse drive, reverse line pressure from passage 202 is distributed to the differential area of spaced lands on the valve element 196, thereby creating an additional force on the spring 194 which augments the line pressure in passage 200.

Passage 172, which receives regulated converter pressure from passage 174 through the space between lands 154 and 156, communicates with bypass clutch passage 204. This pressure regulates the pressure made available to the control space 206 of the torque converter 10. Passage 172 communicates with lube pressure passage 207 when land 208 of the bypass clutch control valve 210 uncovers passage 172 leading to passage 207. Regulated converter pressure in passage 172 acts on the differential area of lands 208 and 214. Land 208 registers with the port communicating with passage 172, and land 214 registers with the land adjacent port 216 which is exhausted through the manual valve. Thus, the bypass clutch pressure in passage 204 is a regulated pressure.

Valve 210 is urged in a right-hand direction by valve spring 218.

Converter fluid is returned from the converter through passage 220 which passes through the space in the bypass clutch control intermediate valve lands 222, 224. This flow complements the flow of converter return fluid through orifice 226. The fluid in passage 220 ultimately is distributed to lubrication passage 228 and the front lubrication circuit, the rear lubrication circuit including passage 230 communicates with passage 172 and with passage 206 through orifice 232.

The bypass clutch control valve 210 is a regulating valve, as explained previously. The regulating valve lands are the differential diameter lands 214 and 208. It regulates converter pressure and produces a bypass pressure in passage 204.

Converter pressure is subject to variables such as changes in throttle opening, road conditions, etc. In order to make the bypass clutch pressure insensitive to such variables in converter pressure, the bypass clutch control valve 210 is provided with a valve element 602 that engages the main valve spool. The spring 218 acts directly on the element 602. Element 602 comprises a valve land 604 and a valve extension 606, the diameter of the land 604 being greater than the diameter of extension 606. This creates a differential area which communicates with converter pressure passage 172 through passage 606. The effective area on the valve element 604 is the same as the differential area of valve lands 208 and 210. Thus, a change in converter pressure due to a variation in operating variables will produce a force on the main spool that is directly cancelled by the corresponding force on the valve element 604.

Thus, when the bypass clutch is calibrated to produce a desired slip for any given operating condition, the magnitude of that desired slip may be changed only by changing the duty cycle of the bypass clutch solenoid. A change in converter pressure will not require a compensating change in the duty cycle, and the control of the clutch thus is improved with respect to reliability. Torque fluctuations due to changing clutch capacity are avoided.

The regulated pressure level maintained by the bypass clutch control is changed by introducing a bypass clutch solenoid pressure to the right end of land 224 through passage 234.

Figure 9:
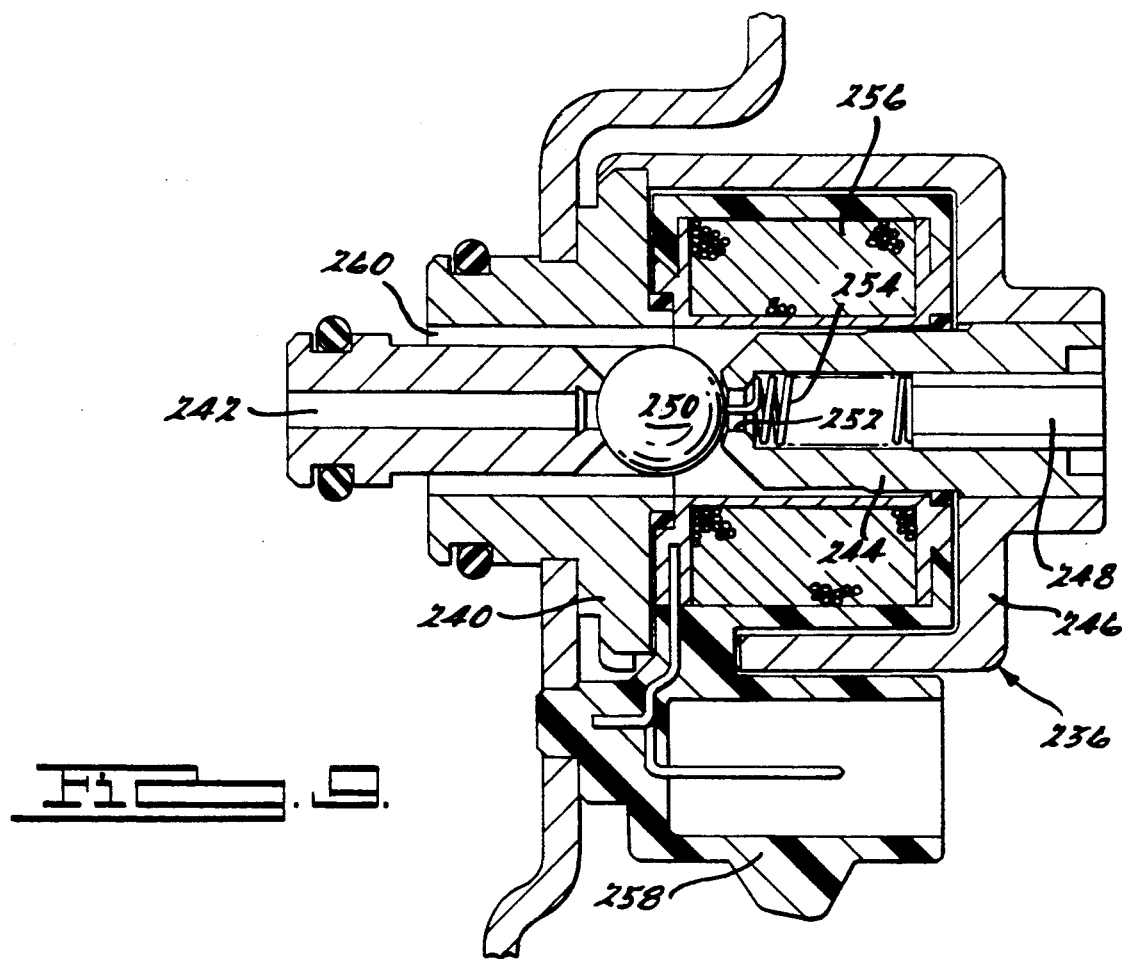
FIG. 9 is a cross-sectional view of a bypass clutch solenoid valve assembly.

The bypass clutch solenoid shown in FIG. 4a at 236 is shown in an enlarged form in FIG. 9. It comprises a housing 240 which receives regulated solenoid pressure through an opening 242. An orifice element 244 is secured to housing portion 246 with an exhaust passage 248 aligned with passage 242. Ball valve element 250 registers with orifice 252 of the orifice element 244. A compression sprig 254 is located within the orifice element 244 and has a stem at its end that normally engages the ball 250, holding it out of contact with the valve seat surrounding the opening 252.

An electromagnetic coil 256 surrounds the ball 2450. It is embedded in a suitable insulating material 258. When the coil 256 is energized, bal valve element 250 acts as an electromagnetic core causing the spring 254 to compress. This increases the pressure in delivery passage 260.

Passage 242 communicates with passage 234 indicated in FIG. 4a. Thus, the magnitude of the pressure in passage 234 is related inversely and proportionately to the pressure in passage 204.

Ratio changes from low ratio to the intermediate ratio are cushioned by capacity modulator valve 236, which is supplied with fluid through feed line 238 when the transmission is operated in the second, third or fourth ratio. Line pressure is distributed through passage 238 to the 1-2 capacity modulator valve at a location intermediate lands 240 and 242, as seen in FIG. 4b. That valve includes a pressure regulating valve spring 244 which opposes feedback pressure distributed to the left side of the land 240 through feedback pressure passage 246. Intermediate clutch pressure is fed from the valve 236 through orifice 248 to the 1-2 accumulator 250, which includes an accumulator chamber defined in part by a piston 252, which is biased by accumulator piston spring 254. The pressure on the other side of the piston 252 is distributed to the accumulator 250 through passage 256.

The accumulator pressure for the 1-2 accumulator and the 3-4 accumulator are developed by the accumulator regulator valve 258. This comprises spaced lands 260, 262 and 264, lands 262 and 264 having a differential area which is subjected to pump pressure in passage 266. That passage communicates with passage 200 discussed with reference to FIG. 4a. A regulator spring 268 urges the regulator valve spool toward the right. The regulated output pressure of the accumulator regulator 258 is line 270 which communicates with the spring side of the 3-4 accumulator and the 1-2 accumulator. Feedback pressure is distributed to the left side of the land 260 through passage 272. Land 262 registers with a port that communicates with passage 266, thereby providing each of these two accumulators 250 and 276 with a pressure that opposes a spring force, the accumulator pressure being delivered to the accumulator 276 as well as to the accumulator 250 through passage 278.

Figure 5:
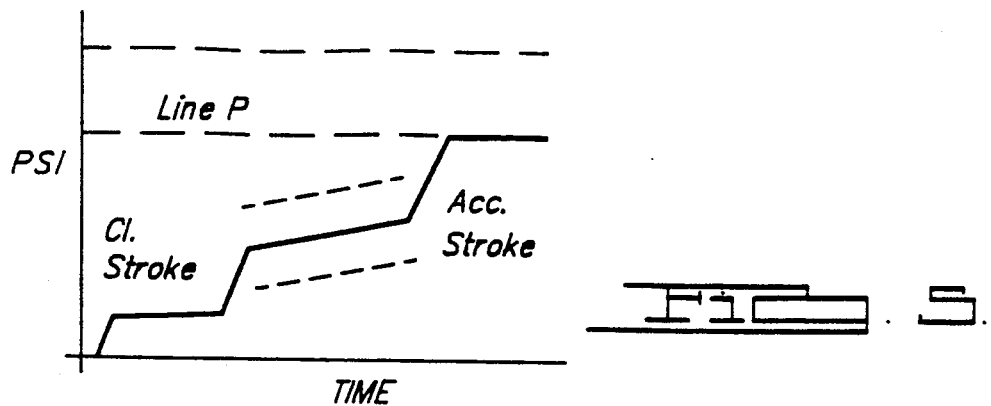
FIG. 5 is a chart showing the relationship between the intermediate clutch servo pressure and time during a ratio change from the low ratio to the intermediate ratio.

Forward clutch pressure is delivered from a forward clutch control, to be described subsequently, through line 280. This pressure shortens the spring 268 as front clutch pressure acts on the left side of the plunger 282. The stroke pressure for the 1-2 accumulator then will rise or fall, depending upon the magnitude of the line pressure in passage 280. This is illustrated in the chart in FIG. 5 where time is plotted against forward clutch pressure. During the initial time interval, the pressure rises until the intermediate clutch spring force is overcome. The piston for the clutch then will stroke, as indicated by the clutch stroke line. Clutch capacity increases as the pressure in the accumulator builds up against the opposing force of the spring. After the spring force and the pressure force of the accumulator regulator valve are overcome, the accumulator piston will begin to stroke following the accumulator stroke line of FIG. 5. After stroking is complete, the clutch pressure will rise sharply until line pressure is achieved in the clutch. The dashed stroke lines in FIG. 5 correspond to the dashed line pressure lines. As line pressure rises and falls, the stroke pressure will rise and fall accordingly.

Unlike the case of the front clutch pressure on a 1-2 shift, the 3-4 line pressure does not act on the plunger 282 to shorten the spring. Thus, it does not modify the output pressure in line 278 received by the 3-4 accumulator. Thus, the accumulator-regulator functions during a 3-4 shift as brake B1 becomes applied.

The 3-4 accumulator includes piston 286 and an accumulator spring 288 acting on the piston to supplement the force of the accumulator-regulator pressure supplied to the 3-4 accumulator to passage 278.

Overdrive servo pressure is supplied to the over drive servo B1 through line 290. The pressure in passage 290, after passing through orifice 292, is transmitted to the upper side of the piston 296 of the 3-4 accumulator.

Neutral-to-drive engagements are regulated by 2-1 downshift control 298. This control comprises valve spool 300 situated in a valve chamber and includes a valve that is urged in a right-hand direction by valve spring 302. It is urged in a left-hand direction by throttle valve pressure which acts on the right side of land 304.

During a 2-1 downshift, the intermediate clutch exhaust flow path from the intermediate clutch includes line 304. If the 2-1 downshift is a power-on downshift, throttle pressure is sufficient to move the valve to the left, allowing intermediate clutch exhaust fluid to exhaust through exhaust port 306. If the 2-1 downshift is a coating downshift, the valve 300 will assume the position shown in FIG. 4b, and line pressure from line pressure passage 310 passes through orifice 312 as line pressure is fed through the engagement valve to be described subsequently. Thus, a second orifice is introduced during a power-on downshift, the first orifice in the intermediate clutch exhaust flow path being orifice 314 and the second orifice being orifice 317 in FIG. 4c. This allows the intermediate clutch to be applied more quickly than in the case of a coating 2-1 downshift.

Shown in FIG. 4b is a pressure failsafe valve 315 which comprises a simple shuttle valve spool 316 having spaced valve lands 318 and 320. Valve spring 322 urges the spool 316 in a right-hand direction, as viewed in FIG. 4b.

When the valve spool 316 is positioned as shown in FIG. 4b, converter regulator output pressure in passage 324 communicates directly with TV passage 326. This pressure acts on the left side of throttle booster valve element 196 of the main regulator valve assembly described with reference to FIG. 4a.

During normal operation, variable force solenoid pressure is distributed to the right end of land 320 through passage 328. This pressure is developed by variable force TV solenoid valve 330 shown in FIG. 4a. Under the influence of variable force solenoid pressure, valve element 316 is shifted to the left, thereby establishing communication between passage 326 and passage 328 so that line pressure can be distributed to the booster element of the main regulator valve assembly of FIG. 4a. Thus, if the variable force solenoid circuit should fail for some reason, or if the valve should stick and become nonfunctional, line pressure will be boosted to a maximum by the main pressure regulator valve as converter regulator output pressure is substituted for TV pressure at the booster valve element 196.

Figures 10, 11:
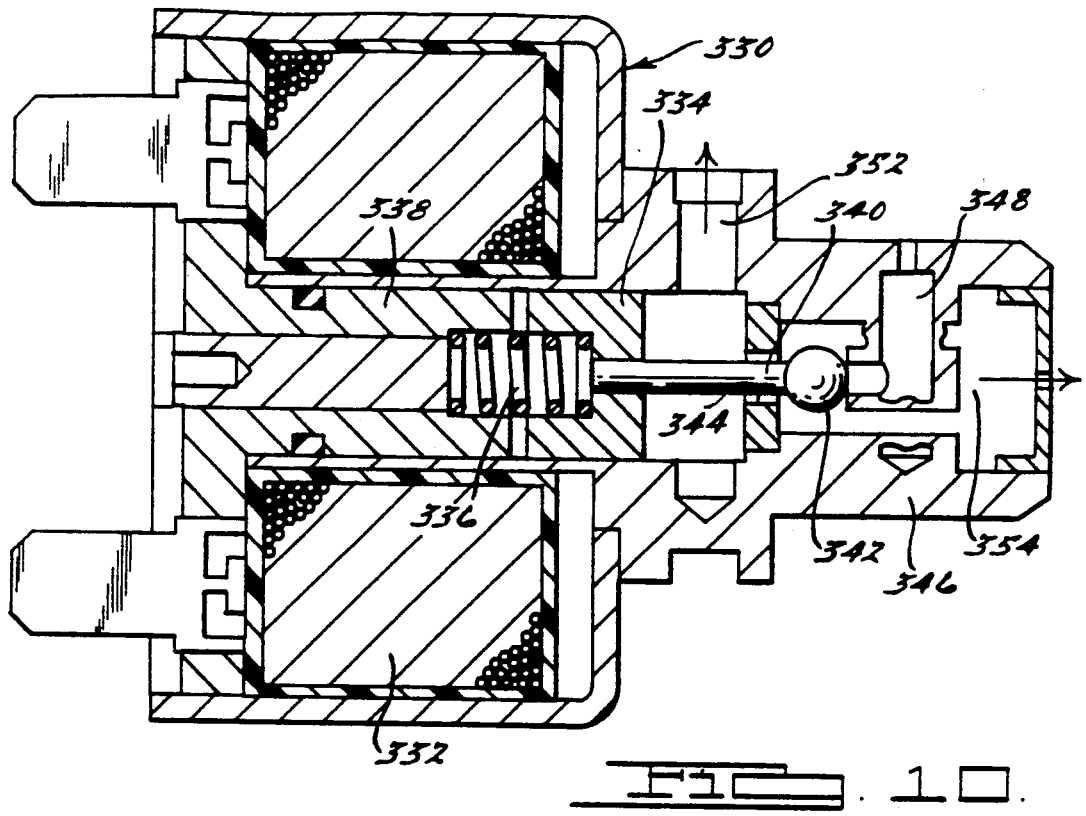
FIG. 10 is a cross-sectional view of a variable force throttle valve assembly for use in the valve system of FIGS. 4a through 4d.
FIG. 11 is a chart showing the engagement state of the three solenoid valves of FIG. 4c during each drive range and drive ratio.

The variable force solenoid 350 of FIG. 4b is shown in more particular detail in FIG. 10. It includes a solenoid assembly 330 comprising solenoid windings 332 and an armature 334. A valve spring 336 acts between the stationary portion 338 of the solenoid assembly and the armature 334. A valve actuator pin 340 is carried by the armature 334 and is adapted to engage ball valve 342. Ball valve 342 registers with orifice 344 located in valve housing 346.

The variable force TV solenoid valve has a feed port 348 which communicates with converter regulator pressure line 350, as seen in FIG. 4a. Numeral 352 designates an exhaust port in the VFS TV solenoid valve body. It communicates with the orifice 344.

Ball valve 342 is located on the feed side of orifice 344. A signal passage 354 is located on the feed side of orifice 344.

Normally, plunger or armature 334 and the pin 340 will unseat valve 342 from the orifice 344 under the influence of the force of spring 336. If current is applied to the solenoid, the valve will become seated as the armature 334 is subjected to the electromagnetic force that opposes the spring force. This is accompanied by an increase in the pressure in the signal passage 354. The valve becomes unseated as voltage to the solenoid windings is decreased. As the current for the solenoid increases, the ball valve 342 will tend to seat against its orifice, thereby causing a pressure increase in the signal passage 354. Signal passage 354 communicates with variable force solenoid passage 356 which communicates with passage 328 in FIG. 4b.

Throttle valve pressure is distributed to passage 236 and to the main pressure regulator as explained previously. The same pressure is distributed through ball valve 358, as seen in FIG. 4c and to TV pressure passage 360, which acts on the right end of engagement valve 362 shown in FIG. 4c.

Figure 4D:
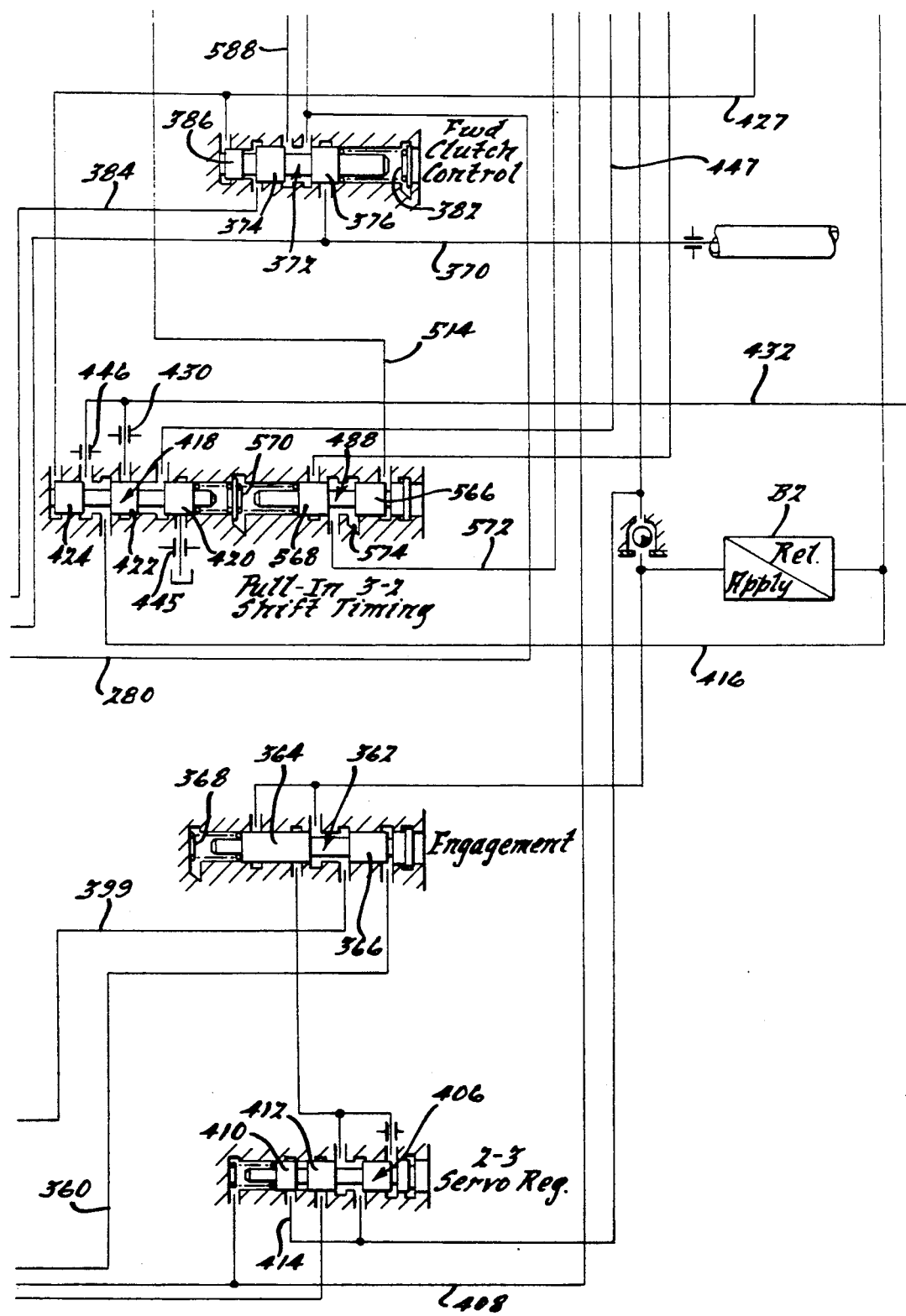

The Control Valve Circuit Of FIG. 4d

Engagement valve 362 comprises lands 364 and 366 which may be of equal diameter. It is urged in the right-hand direction by valve spring 368.

On a neutral-to-drive shift of the manual valve, pump pressure is passage 200 will be distributed to passage 370 to the forward clutch control valve 372. Forward clutch control valve 372 comprises a valve spool having lands 374 and 376. When the valve 372 moves to the right position against the opposing force of spring 382, line pressure from passage 370 will be delivered directly to passage 378 and through 3-4 shift valve 388 to the front clutch feed passage 390. Orifice 392 is located in feed passage 390 to cushion the engagement of the forward clutch CL1. The valve assumes the right-hand position, as seen in FIG. 4d, as pressure in passage 384 acts on the differential area of lands 374 and 386. Passage 384 receives its pressure from the three-position check valve 394 which communicates through the check valve with line pressure passage 396.

As the forward clutch becomes pressurized, pressure builds up in passage 378, which is transferred through line 280 to the orifice 298 in FIG. 4b, thus shifting the spring seat 382 of the accumulator-regulator valve. This shortens the accumulator valve spring, as explained previously. A coasting 2-1 downshift result in a pressure build-up in passage 399 which communicates with the neutral drive accumulator, as indicated in FIG. 4b.

This accumulator comprises a piston 400 with an accumulator chamber spring 402 and an accumulator volume 404. Line pressure for the low-and-intermediate servo B2 acts on the upper end of the piston 400 and cushions the engagement of the servo as pressure is delivered to the apply side of servo B2 through the engagement valve 362. During a coasting 3-2 downshift, it is necessary for the brake servo B2 to become applied. The 2-3 servo regulator 406 acts as a regulator valve in this instance as fluid is delivered to the apply side of the brake servo B2 through the engagement valve 362, which is moved to the left by pressure in passage 360.

There is no line pressure in passage 408 at the beginning of a coasting 3-2 downshift. Thus, the valve 406 may act as a regulator valve on a coasting 3-2 downshift. The feedback pressure for the differential area of lands 410 and 412 communicates with feedback passage 414. The relationship between time and servo pressure in this instance is illustrated by the chart of FIG. 6a. After the downshift is completed, the control strategy for the solenoid 464 in FIG. 4c will delay turning on the solenoid. After the coasting downshift is done, the solenoid is turned on.

On a torque demand 3-2 downshift, line pressure is present in line 408. This line pressure from line 494 passes directly through the valve 406 and through the engagement valve to the apply side of servo B2.

Figure 6:
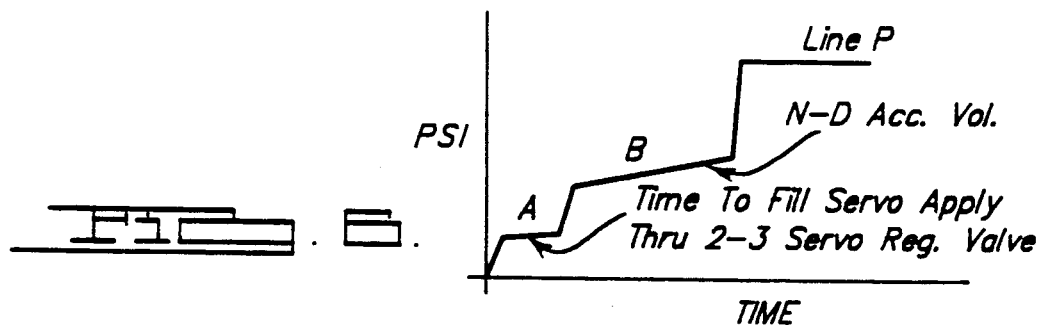
FIG. 6 shows the relationship between the low-and-intermediate servo pressure and time during a transition from neutral to the drive condition.
Figure 7:
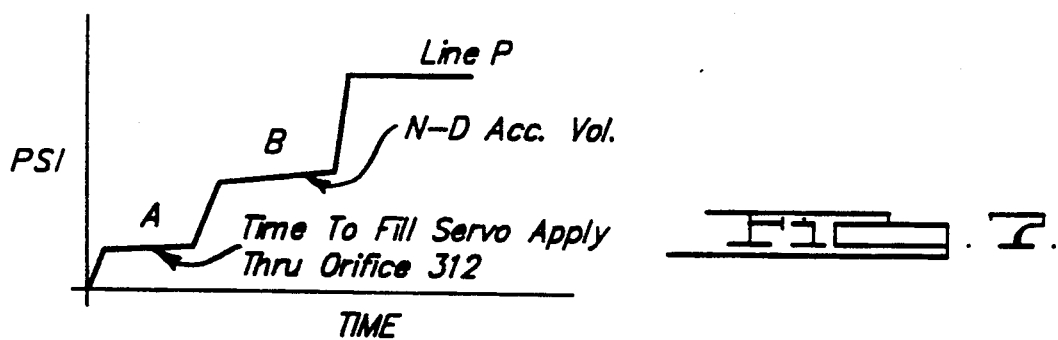
FIG. 7 is a chart showing the relationship between the low-and-intermediate servo apply pressure and time during a downshift from the direct drive ratio to the intermediate ratio.

In FIG. 6, the portion of the curve representing the low-and-intermediate servo engagement shown at A is the pressure build-up rate due to the cushion spring in the servo. The portion of the curve represented by the symbol B is that characteristic that is due to the neutral-drive accumulator volume. After the line 416 exhausted, the servo pressure will rise to a maximum pressure corresponding to line pressure. FIG. 7 shows the corresponding time versus servo pressure relationship when the servo is fed through orifice 312. In this instance, the fill time is less. Thus, the portion of the curve shown at B is shorter than the corresponding portion of the curve of FIG. 6.

On a 3-2 shift, as the servo B2 becomes applied, fluid is released from the release side of the servo. The release fluid passes through line 416 to the 3-2 shift timing valve shown at 418 in FIG. 4d. The valve 418 includes three spaced valve lands of equal diameter, as shown at 420, 422 and 424. When the valve is positioned as shown, line 416 communicates with passage 432 which has in it orifice 446. Passage 432 extends to the direct clutch exhaust line. On a 3-2 downshift at high speeds, the timing valve 418 will be moved to the right. This is accomplished by pressurizing passage 427 by solenoid valve 428. This also pressurizes the left end of the forward clutch valve 372 causing it to shift to the right and to connect pump pressure line 372 to the forward clutch feed line 390 through the 3-4 shift valve. The release side of the brake B2 then is exhausted through passage 416 and through orifice 430 in the line 432. Fluid from the working chamber of the direct clutch CL3 then is discharged through orifice 455 as well as orifice 444 in the 1-2 shift valve, which communicates with orifice 445 through line 447. Line 432 extends through check valve 434 to line 436 and through check valve 438 to line 440. This line extends to the 1-2 shift valve 482 at land 442 which, under these conditions, assumes a left-hand position shown in FIG. 4c. Line 440 then is exhausted through orifice 444 to the reservoir.

Figure 7A:
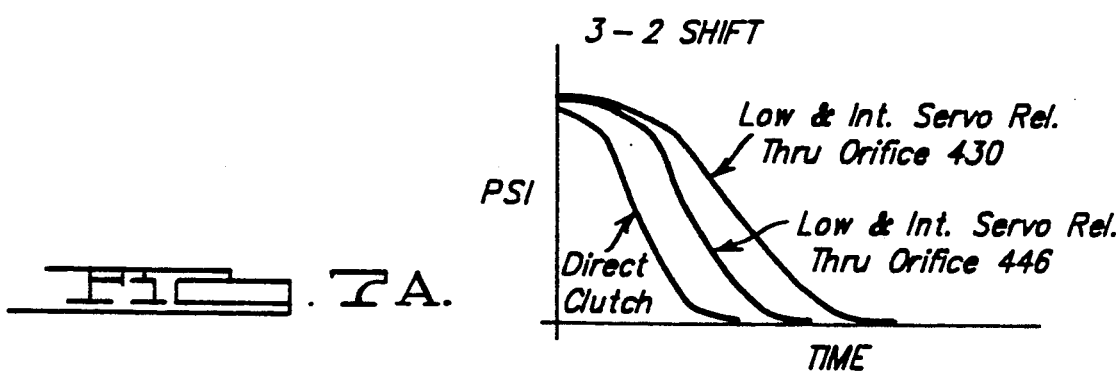
FIG. 7A is a chart showing the rate of decay of servo release pressure for the low-and-intermediate servo during a 3-2 downshift and the rate of decay of the direct clutch pressure.

Orifice 430 is larger than comparison orifice 446. At low speeds, the shift timing valve 418 is in the position shown. Thus, the line 416 is exhausted through orifice 446 rather than orifice 430. Thus, the decay time is greater, as indicated in the chart of FIG. 7A. In the case of a 3-2 shift at high speeds, with the valve 418 in the right-hand position, a part of the direct clutch exhaust flow occurs through secondary orifice 446 in the 3-2 shift timing valve. This further reduces the shift timing. In the chart of FIG. 7a, there is shown also a decay curve for the pressure in the direct clutch as well as the corresponding curves illustrating the rate of decay of the pressure on the low-and-intermediate servo release.

Referring again to FIG. 4a, the solenoid regulator valve 448 includes three lands 450, 452 and 456, the latter registering with exhaust port 458. Valve 448 is biased in a right-hand direction by valve spring 460. Line pressure from passage 164, which is pressurized during second, third and fourth ratio is distributed to the valve 448. That pressure is regulated at a constant value by the valve 448 which distributes pressure to the intake side of the bypass clutch solenoid described with reference to FIG. 9. The output from the bypass clutch solenoid 236 is delivered to the bypass clutch control through passage 234, as previously explained.

Regulated converter pressure is delivered to passage 460 which feeds the TV solenoid 330, and each of the shift solenoids 462 and 464 in addition to the third solenoid 428 described previously. Each of the solenoids 462, 464 and 428 is normally open. When they are not energized, solenoid feed pressure is delivered directly from passage 460 to signal passages 466, 468 and 426, respectively. The solenoids are on-off solenoids. Flow from the feed passage 460 to each of the signal passages is interrupted when they are energized.

Figure 8:
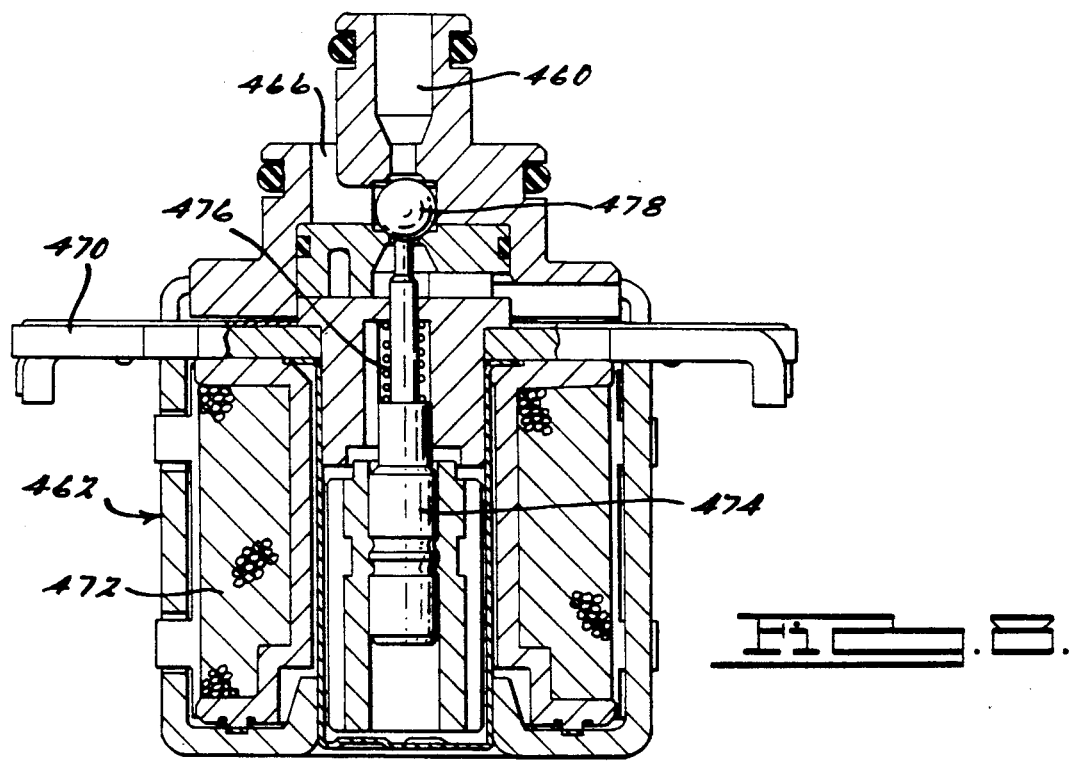
FIG. 8 is a cross-sectional view of a typical solenoid valve assembly for controlling ratio changes and for controlling engagement and release pressures.

FIG. 8 shows an enlarged cross-sectional view of the solenoid 462. Each of the other solenoids is similar.

Solenoid 462 comprises a mounting plate 470, solenoid coil 472, an armature 474 and a spring 476 surrounding the armature to normally bias the armature out of engagement with solenoid ball valve element 478, thus opening the flow passage from line 460 to 466. When the solenoid windings are energized, the armature closes the valve element 478 against the valve seat defining in part passage 460.

Solenoid valve 428 provides a signal in passage 426 which is distributed to the left end of land 427 of the 3-2 shift timing valve 418. The solenoid under the control of the microprocessor then will actuate the valve so that a selection may be made for the larger orifice 432 or the smaller orifice 446. This distinguishes between the high speed 3-2 shift timing requirement and a low speed shift timing requirement as explained previously.

Solenoid 428 supplies also a signal to the left end of land 386 of the forward clutch control valve 372. This is done in order to provide engine braking in third gear which requires application of the forward clutch. The differential are of lands 374 and 386 is not pressurized, as explained previously, during operation in third gear and overdrive.

Control Valve Circuit Of FIG. 4c

The ratio changes in the transmission are under the control of the 2-3 shift valve, the 1-2 shift valve, the intermediate clutch shuttle valve, the 3-4 shift valve and the pull-in valve. These valves are respectively identified by reference numerals 480, 482, 484, 486 and 488. Each of these valves is a shuttle valve and can assume either one position or the other depending upon whether a solenoid pressure signal is available. These valves are under the control of only two solenoids, namely, solenoids 462 and 464. Thus, ratio changes between each of the four ratios can occur as each of the individual valves performs multiple functions. The 2-3 shift valve has a solenoid valve pressure land 490. That pressure is pressurized by solenoid valve pressure from solenoid 464 which is distributed to the 2-3 shift valve through passage 468. Valve 480 includes a valve spring 492 which moves it to the left when a solenoid valve signal in passage 468 is absent.

Line pressure exists in passage 494 when the manual valve is in the overdrive position, the D position, or the 1 position. Valve lands 496 and 498 on the 2-3 shift valve establish communication between passage 494 and passage 500 when valve 480 is shifted in a right-hand direction against the force of spring 492. When the valve 480 assumes the position shown in FIG. 4c, passage 500 communicates with exhaust port 502.

The solenoid valve 464 will develop a pressure in passage 468 that shifts the valve to the right to condition the transmission for operation in third and overdrive ratios. During operation in the first and intermediate ratios, spring 492 urges the valve 480 in a left-hand direction. When the valve 480 is in the left-hand position, passage 500 is exhausted through port 502 and the passage 494 communicates with passage 504, which is connected to passage 408 as seen in FIG. 4d.

The 1-2 shift valve 482 assumes the position shown in FIG. 4c during operation in the second and the fourth ratios. During operation in the first and third ratios, it is shifted to the right. The shifting movement is established as the valve 482 responds to a signal in passage 466 from the solenoid valve 462. The signal acts on the left side of land 506. Valve spring 508 normally shifts the valve 482 in a left-hand direction.

Valve 482, in addition to land 506, includes lands 510, 514 and previously described land 442. When the valve is positioned as shown in FIG. 4c, the direct clutch apply pressure in passage 418 is exhausted through exhaust port 520. When the valve 482 is shifted in a right-hand direction, line pressure passes directly from passage 522 to the direct clutch feed passage 518 whenever passage 522 is subjected to line pressure. That condition exists when the manual valve is shifted to a manual low range position.

When the valve 482 is positioned to the left, as shown in FIG. 4c, communication is established direction between line pressure supply passage 524 and passage 526, the latter extending to the shuttle valve 484. Passage 524 is connected to passage 148 shown in FIG. 4a whenever the manual valve is in the overdrive position, the drive position D or the manual low position, the drive position D or the manual low position. Passage 526 is exhausted through exhaust port 528 when the valve 482 is shifted in a right-hand direction during operation in the first and third ratios.

When the valve 482 is shifted in a left-hand direction, communication is established between feed passage 530 for the 3-4 shift valve and passage 532, which communicates with passage 500 described previously. Passage 532 serves as a feed passage for the intermediate clutch shuttle and the 3-4 shift valve. Passage 530, which is a signal passage for the 3-4 shift valve, communicates with exhaust orifice 444 through the 1-2 shift valve when the shift valve is shifted in a right-hand direction. When it is in that position, passage 532, which communicates with the line pressure passage 495 through the 2-3 shift valve, communicates with passage 440 which supplies line pressure to the direct clutch CL3 through one-way check valve 534 as shown in FIG. 4c.

When passage 526 is pressurized as the 1-2 shift valve moves to the left-hand position during operation in the second and fourth ratios, the intermediate clutch shuttle valve 484 will be shifted to the right as land 536 becomes pressurized. Intermediate clutch shuttle valve 484 includes, in addition to the land 536, lands 538 and 540 which establish communication between intermediate clutch exhaust passage 542 and lien pressure feed passage 544. Passage 544 is connected to passage 164, which is pressurized during operation in the second, third and fourth ratio.

The release side of the low-and-intermediate servo B2 is exhausted through orifice 317 and one-way check valve 546 when the transmission is conditioned for operation in the second, third and fourth ratios. If the shuttle valve is shifted to the right, passage 544 is connected to line pressure feed passage 548. This feed passage is connected to passage 148 described with reference to the manual valve of FIG. 4a.

The intermediate clutch shuttle valve thus will interrupt the supply of line pressure to passage 544 and prevent application of the low-and-intermediate servo whenever the solenoid valve signal for solenoid valve 462 is exhausted from passage 466. That correspond, as explained previously, to the position of the 1-2 shift valve shown in FIG. 4c.

The 3-4 shift valve 486, in addition to the land 388, includes valve lands 550, 552 and 554. The 3-4 shift valve 486 is urged in the left-hand direction by a valve spring 556. The corresponding valve spring for the intermediate clutch shuttle valve is shown at 558. The overdrive servo B1, which is supplied through passage 290 as explained previously, is exhausted through control orifice 558 when the 3-4 shift valve is positioned as shown. This releases the overdrive brake B1.

Passage 290 is connected to passage 532 when the 3-4 shift valve is shifted in a right-hand direction. Passage 532 is pressurized, as explained previously, during operation in the third and fourth ratios. This causes the overdrive brake servo to become applied. The 3-4 shift valve can be shifted in the right-hand direction only if passage 530 is pressurized, and that occurs only when the 1-2 shift valve is in the left-hand position, thereby permitting distribution of line pressure from passage 532 through the 1-2 shift valve.

During operation in reverse, the 3-4 shift valve 486 is shifted in a right-hand direction under the force of the reverse line pressure in passage 560, which acts on the differential area of lands 554 and 552. This allows reverse line pressure from passage 560 to pass directly through the 3-4 shift valve to the front clutch feed passage 390.

Pull-in valve 488 is available to supply a shift signal for the 1-2 shift valve and the 2-3 shift valve if the control system should lose power, thereby rendering solenoid valves 462 and 464 inoperable. These are normally open valves, so if a power failure occurs, converter regulator output pressure in passage 350 will pass directly into lines 466 and 468. This normally would shift the 2-31 shift valve in a right-hand direction and will shift the 1-2 shift valve 482 in a right-hand direction against the opposing force of their respective springs. As soon as the operator is aware of a power failure, he may move the manual valve to the "1" position whereby regulated pump pressure is delivered to line 562. This pressure is delivered to passage 564 and to the right side of land 566 of the pull-in valve.

The pull-in valve comprises, in addition to the land 566, a land 568. A valve spring 570 normally urges the pull-in valve to the right. Signal passage 468 communicates with the pull-in valve; and when the valve assumes the position shown, land 568 blocks passage 468. At the same time, signal passage 572 is exhausted through exhaust port 574. When the operator pulls the manual valve to the manual low range position, line pressure will be distributed to the right side of the land 466 and shift the valve 488 in a left-hand direction, thereby blocking exhaust port 574 and opening passage 468 to passage 572. Thus, a new signal passage is made effective. That signal passage identified by numeral 572 distributes line pressure to a spring chamber for spring 508 of the 1-2 shift valve and to the spring chamber for spring 492 of the 2-3 shift valve. This returns each of the shift valves to their left-hand positions. Thus, the transmission will be conditioned for continuous operation in the intermediate speed ratio. In an emergency, therefore, the vehicle operator may drive the vehicle in intermediate ratio to a service center where the voltage failure can be repaired.

Summary Of Operation Of Valve System

For the purpose of summarizing the valve functions during operation in each of the four forward driving ratios and the single reverse ratio, the following overview is provided.

If the manual valve is shifted to the overdrive position, pump pressure will be distributed to passage 148. Pump pressure also is applied to passage 150 which pressurizes passage 370. This supplies pump pressure to the forward clutch control 372.

The 2-3 shift valve is shifted to the left under the influence of its valve spring 492. Line pressure from pressurized passage 148 then is distributed through the 2-3 shift valve between the lands 490 and 496 to passage 504. Line pressure then passes through check valve 438 as passage 408, which communicates with passage 504, becomes pressurized.

Check valve 394 connects passage 396 with passage 384, thus causing the forward clutch control valve 372 to be shuttled to the right. Pump pressure in passage 370, which communicates with passage 150, then communicates with passage 380. This supplies the forward clutch through the 3-4 shift valve, which is in the left-hand position at this time.

Passage 396 feeds orifice 312, the down-stream side of which communicates with the neutral-to-drive accumulator and passage 398 which feeds the engagement valve 362. Line pressure passes through the engagement valve 362. Line pressure passes through the engagement valve to the apply side of the low-and-intermediate brake servo B2. With the low-and-intermediate brake servo and the forward clutch thus applied, the transmission is condition for operation in the first ratio.

A shift from the first ratio to the second ratio occurs as line pressure is distributed from passage 524 and through the 1-2 shift valve, which is in the left-hand position as explained previously. Line pressure then passes from the passage 524 through the 1-2 shift valve to passage 526, which triggers the intermediate clutch shuttle valve, pushing it to the right. This allows line pressure to be transferred from passage 548 to passage 544. The 1-2 capacity modulator valve communicates with passage 544 through passage 238. Line pressure passes through valve 236 and pressurizes passage 246, thus engaging the intermediate clutch CL2. The servo B2 remains applied as previously explained with reference to operation in the first ratio.

A ratio change from the second ratio to the third ratio when the manual valve is in the OD position occurs as the 2-3 shift valve is shifted in a right-hand direction as explained previously. Line pressure then is delivered from passage 494 to passage 500. The 1-2 shift valve is shifted in a right-hand direction, as explained previously. This causes pressurized passage 500 to deliver pressurized fluid to passage 440, which is connected through the check valve 438 to passage 582. That passage is in communication with the direct drive clutch CL3 through the check valve 534. Direct clutch pressure is distributed also to line 432 and through check valve 584 to the release side of the low-and-intermediate brake servo B2. With the direct clutch applied and the low-and-intermediate servo released, and with the intermediate clutch remaining applied, the transmission is conditioned for direct-drive operation.

If it is desired to have coast braking in direct drive ratio, the manual lever may be shifted to the D position, thereby pressurizing passage 596. Line pressure is then delivered from line 596 to line 588, as shown in FIG. 4d. This pressure then passes through the forward clutch control valve to passage 380 which supplies the forward clutch feed passage 390. With all three clutches applied the transmission is conditioned for coast braking with the transmission int he direct-drive condition.

Orifice 592 is provided in passage 588 in order to control manual 4-3downshifts as the manual valve is moved from the OD position to the D position. When fluid is delivered in the opposite direction, one-way check valve 594 bypasses the orifice 592.

When a shift to the fourth ratio from the third ratio is desired, the 2-3 shift valve remains in the right-hand position, and the 3-4 shift valve is shifted in a right-hand direction. Thus, line pressure is transferred from passage 494 to passage 532 and then to the 3-4 shift valve. The 3-4 shift valve is shifted in a right-hand direction as explained previously during operation in the fourth ratio. Thus, line pressure is transferred from passage 532 to passage 290. It then passes through the check valve 438 to direct clutch feed passage 582. Fluid is transferred also to passage 432 by the check valve 534 and through check valve 584 to the release side of the low-and-intermediate servo B2.

Pressurized passage 290 communicates with the overdrive servo B1 through orifice 292 and to the pressure side of the 3-4 accumulator. With both the direct clutch applied and the overdrive servo applied, the transmission is conditioned for overdrive operation.

Reverse drive is obtained by moving the manual valve to the reverse position, which causes line pressure to be distributed to passage 560 to the check valve 394 and then to passage 384. This causes the forward clutch control valve to be shifted to the right. This results in a direct connection between pump pressure passage 370 and passage 380 which feeds the forward clutch CL1 through the 3-4 shift valve and the feed passage 390. The reverse clutch CL4 is applied because of the direct connection between passage 560 and the reverse clutch feed orifice 600.

On a neutral to manual low engagement, the manual valve is moved to the "1" position as in the case of a pull-in shift. Line pressure in passage 562 then is passed directly to the 2-3 servo regulator valve 406 in FIG. 4d. At that time, the 2-3 servo regulator valve spool is in a left position because of line pressure in lien 504. Line pressure in passage 408 is not developed instantaneously upon movement of the manual valve because of the time lag due to the stroking of the servo piston. Thus, servo B becomes applied with a cushion action as apply pressure builds up in the low-and-intermediate servo gradually. Solenoid 3 is turned off in part and neutral, leaving forward clutch LC1 applied. Thus, it is necessary to apply the low-and-intermediate brake B2 to this softened engagement to effect a low gear engagement from neutral or park. Forward clutch CL1 is pressurized as explained previously with respect to the low ratio operation with the manual valve in the OD position.

During operation in reverse, reverse line pressure is delivered to the reverse boost valve element for the main regulator as explained previously. If there is a failure in the variable force solenoid, the pressure failsafe valve 315 will move to the right under the influence of spring 322, thereby connecting booster passage 326 with converter regulator pressure passage 324. Regulated converter pressure then is substituted for throttle valve pressure on the boost valve element 196 of the main regulator valve, thereby preserving line pressure.

We have shown in FIG. 11 a chart that shows the conditions under which the three solenoids 462, 464 and 428 are energized. As explained previously, when one of these solenoids is energized, the valve is closed, thereby interrupting a signal to the signal passages 466, 468 and 427, respectively. The solenoid states for solenoid 53 is not relevant to PRNDL position "1", so the ON/OFF designation is not used. The same is true for solenoids 51 and 52 for the "R" position of PRNDL. The solenoid state will not affect the transmission operating mode for PRNDL positions "1" and "2".

Figure 3A:
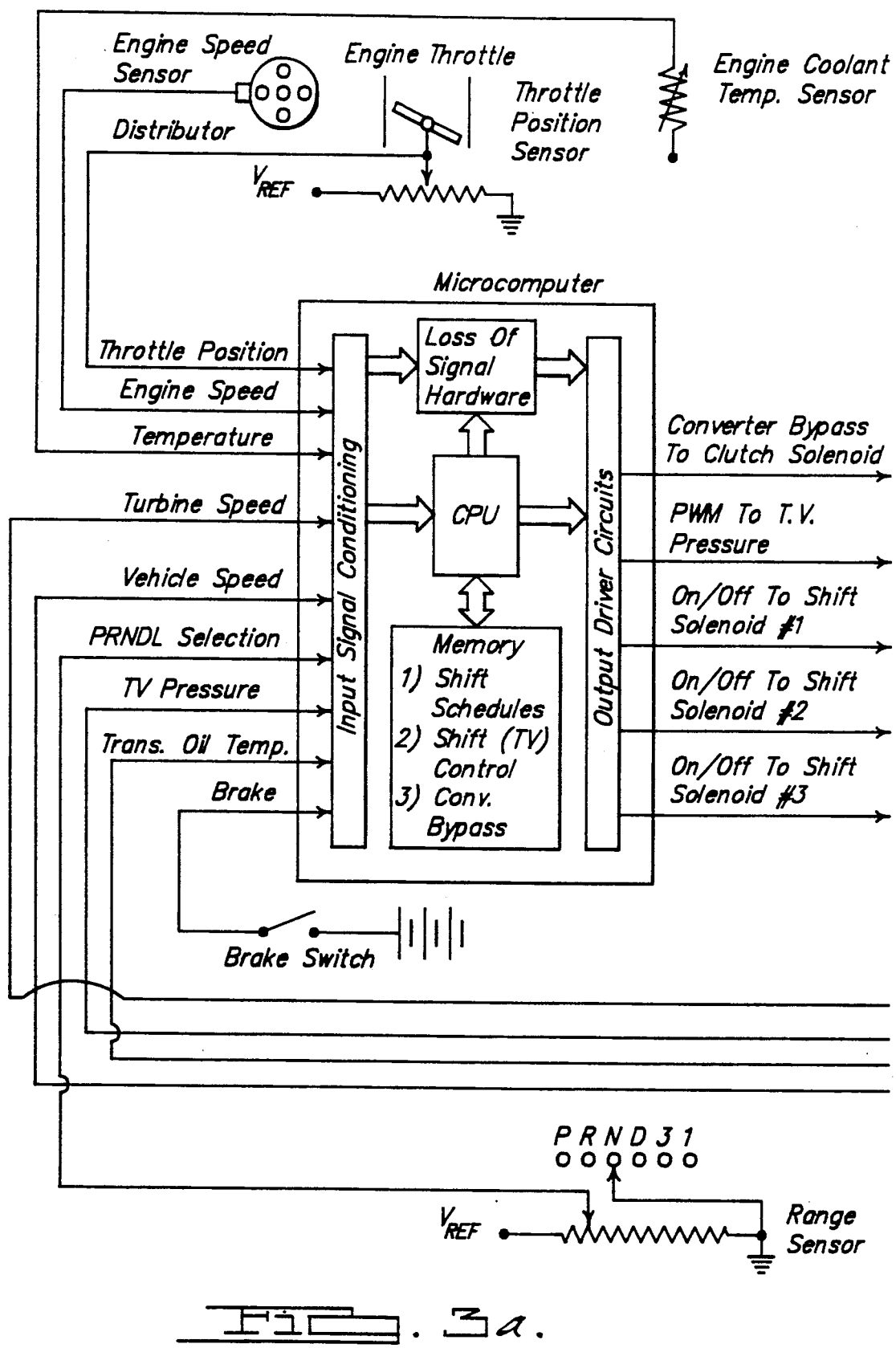
FIG. 3a is a schematic representation of a microprocessor including essential elements of the processor in the environment of the control system of our invention.
Figure 3B:
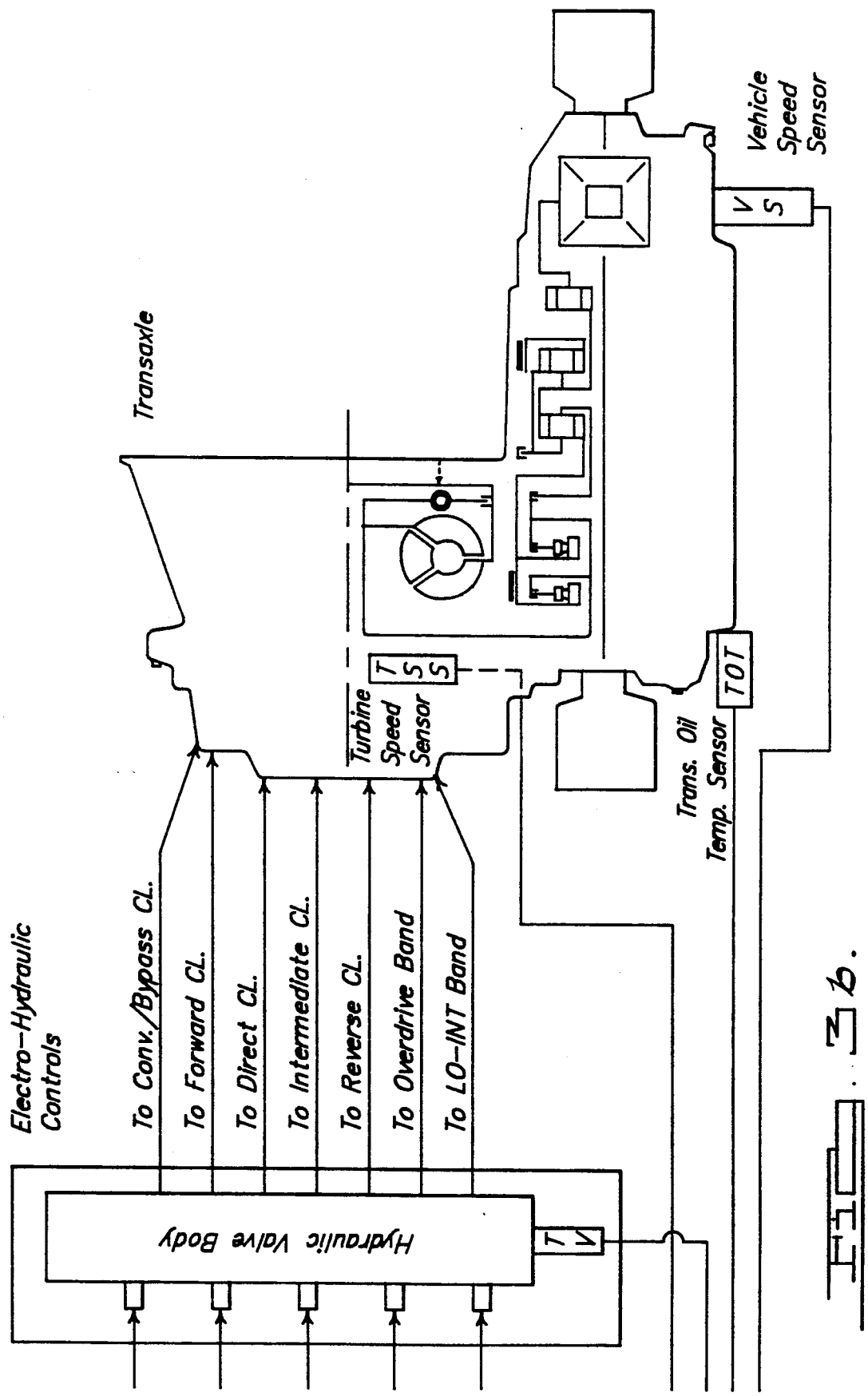
FIG. 3b is a continuation of the view of FIG. 3a showing the hydraulic valve body and its relationship to the clutches and brakes of the transaxle of FIG. 1.

Microprocessor Of FIGS. 3a And 3b

FIGS. 3a and 3b show a schematic diagram of the microcomputer circuit and valve system. The various sensors provide signals for the microcomputer which are received by the input signal conditioning portion of the microcomputer. The shift schedules and the pressure control schedules are stored in the memory portion. The memory registers are addressed by the control processing portions after computations are made using the input signals as variables. The output driver circuit receives the result of the computations and develops output signals for the electrohydraulic controls, as seen in FIG. 3b, including the three solenoid valves, the VFS TV solenoid and the bypass clutch solenoid.

Description Of The Shift Control Modules

The main modules of the control strategy comprise sets of instructions that are distinct one from the other. The main modules, as explained previously, are addressed and executed in sequential order. The sub-routines are executed when called out by the main modules.

Each of the modules will be described with reference to flow charts shown in FIGS. 13-19.

Shift Control Modules (PRNDL-Based Desired Gear Determination)

The first of the main modules is a PRNDL-Based Desired Gear Determination module illustrated in the flow chart of FIG. 12. In executing the strategy of this module, the desired gear is calculated based on the PRNDL position. The gear may be any one of the four forward driving ratios. The desired gear is calculated using this strategy in accordance with a function of throttle position and vehicle speed.

In automatic drive range operation, all four vales for desired gear are possible. That is, a shift from the first ratio to the overdrive ratio may be desired, or a shift from the overdrive ratio to the first ratio may be desired; or if the PRNDL position is in the third position, desired gear changes can be made between the first and the third ratio. The sequence of the ratio changes within the four described ranges of ratio is determined by gear command strategy during multiple-step shifts.

The processor will check sequentially, as explained previously, each register in the module. The first register, after the sequence is initialized at 600, is the PNDL=3 or 4 register, as shown at 602, and a second inquiry is made by addressing the PNDL_LST register to determine if the selector lever is not equal to 3 or 4, as shown at 604 in FIG. 12. Thus, the processor will check whether the PRNDL position is equal to either 3 or 4 and that the register PNDL last is not equal to 3 or 4. These inquiries are made at 602 and 604 to determine whether the PRNDL position has just changed from a non-automatic position to an automatic position. If both of these inquiries are affirmative, the shift in progress timer is cleared. This action is indicated at step 606. At the same time, the flag FLG_SFT$_{13}$IN is cleared. Until that flag is cleared, the routine will not allow automatic shifts. When it is cleared, the processor has indicated that there is no shift in progress.

In the next action step at 608, the processor will set the desired gear equal to the desired gear that was in place and stored in temporary memory during the last background loop.

In the next step of the routine, the register PDL=1is addressed to determine whether the PRNDL position is equal to 1—i.e., in the low drive range position. If that is the case, the desired gear is set to 1 and no automatic shifting will occur. This register is indicated at 610, and the action that occurs if the inquiry is affirmative is indicated at step 612.

The next inquiry is made at step 614 to determine whether the PRNDL position is set equal to 2. If it is equal to 2, the desired gear then is equal to 2 as indicated by the action block 616. In the embodiment described in this specification, it is not possible to carry out the inquiry at 614 because there is no PRNDL position corresponding to PRNDL=2. Thus, in the particular embodiment described here, a negative answer to the inquiry at 610 will cause the processor to proceed directly to the next inquiry at 618 to determine whether the switch SHIFT-IN-PROGRESS is set to 1 or whether the flag FLG_SFT_IN is cleared. In either case, there is no shift in progress and the routine may proceed to step 620.

Figure 13:
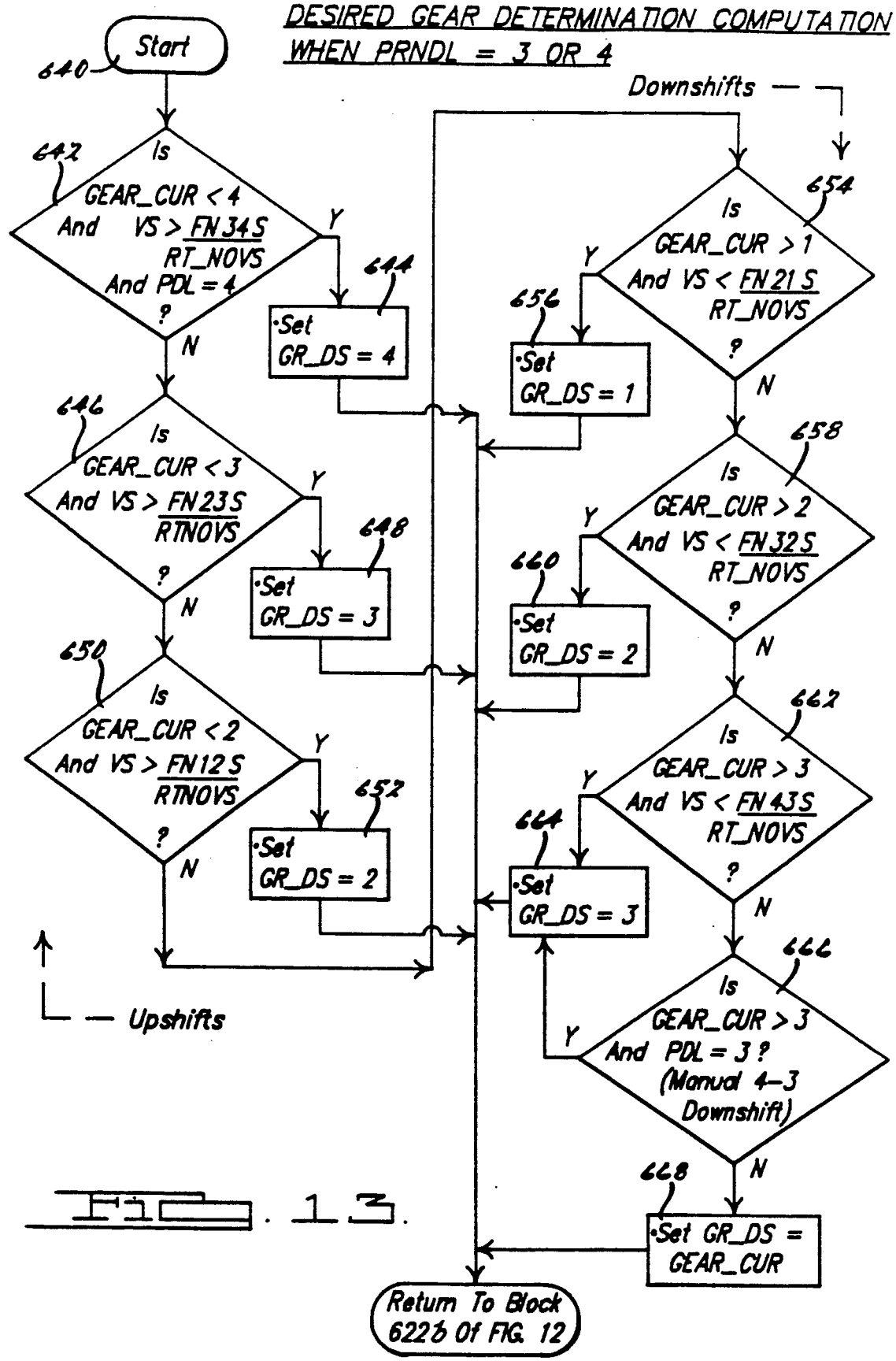
FIG. 13 is a flow chart showing the control strategy for the desired gear determination computation when PRNDL=3 or 4.
Figure 14:
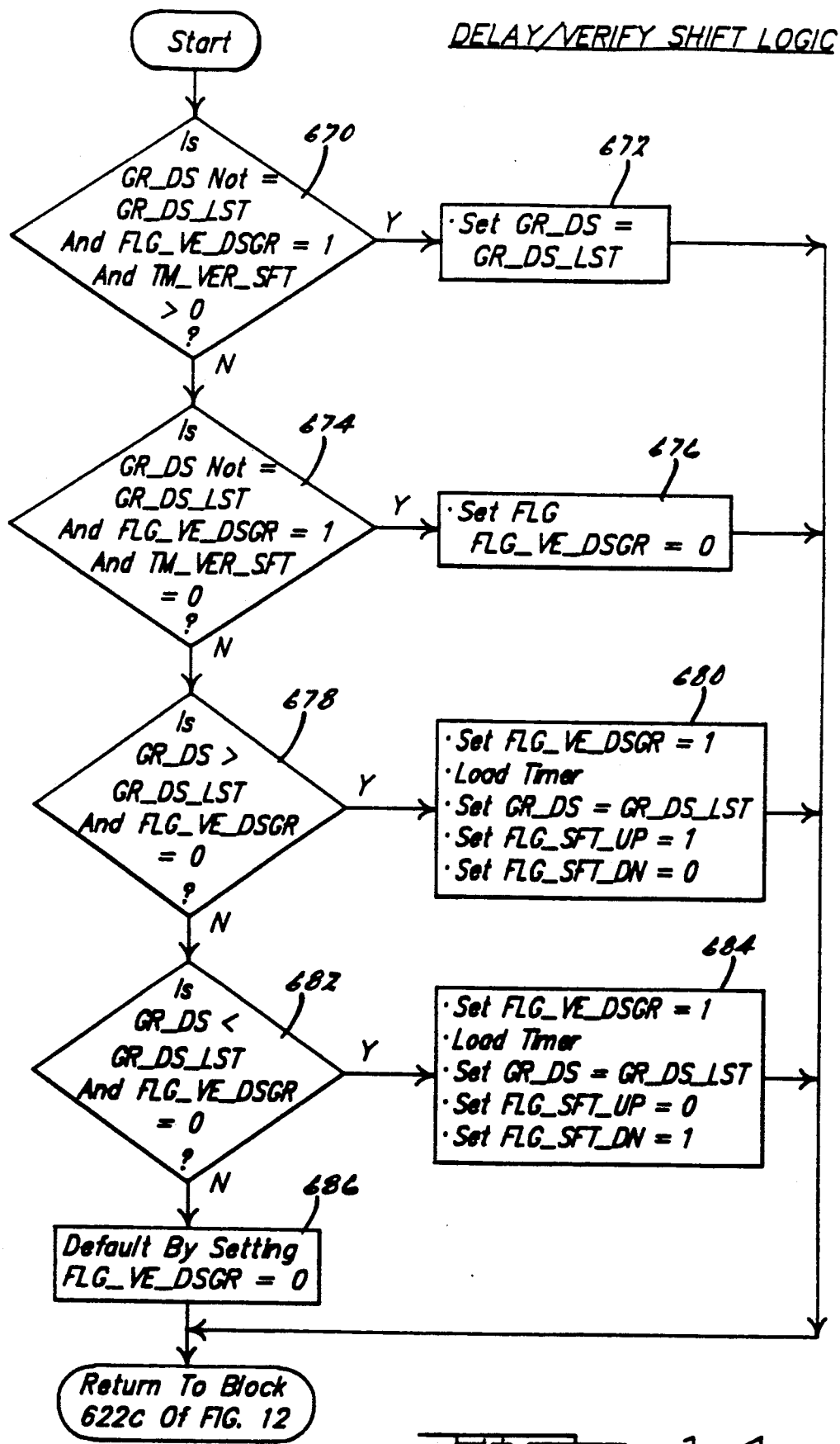
FIG. 14 is a flow chart showing the control strategy for the Delay/Verify Shift Logic module.

If the PRNDL position is 3 or 4, the automatic shift routine indicated in action block 622a is carried out. That is, the logic of FIGS. 13 and 14 is carried out. If the PNRDL position is not equal to 3 or 4, the routine proceeds to register 624 where an inquiry is made as to whether the PRNDL position is in neutral or 5. If that is true, an inquiry is made at 626 to determine whether the vehicle speed is greater than the calculated minimum value. For example, it is determined whether the vehicle is coasting with the manual lever in the neutral position at a speed greater than a minimum value. If that is true, the desired gear then is set equal to 3, as indicated in action block 628. If the vehicle speed is less than the minimum value VS_MIN, other conditions are checked, the first of which is an inquiry at 630 to determine whether the PRNDL position is in 5, 6 or 7. PRNDL position 6 corresponds to reverse position, and PRNDL position 7 corresponds to park, position. If the answer to that inquiry is positive, the gear desired is set equal to 1 at action block 632.

After completion of all of the inquiries indicated at steps 618, 620, 624, 626 and 630 are completed, the routine returns to the step 634. At the register corresponding to step 634, an inquiry is made to determine whether the desired gear is not equal to the desired gear that was present during the last background pass (GR_DS_LST). Stated in a different way, if the desired gear has changed for the logic executed following the operation at action block 608, the routine proceeds to action block 636 where the flag for the new desired gear for the current background pass is set. In that case, a change to the desired gear ratio may occur. Otherwise, a negative response to an inquiry at 634 for the register at step 634 will result in a clearing of the flag FLG_SFT_DS, as indicated in action block 638.

The routine of FIG. 13 determines the desired gear when the manual selector is in 3 or 4. It will compute a gear regardless of whether the ratio change that is indicated is an upshift or a downshift from the current gear.

In the computation illustrated in the flow chart of FIG. 13, the routine begins at 640 and proceeds by addressing a register where an inquiry is made, as shown at 642, to determine whether the current gear is less than 4 and if the vehicle speed is greater than the 3-4 upshift function. The 3-4 upshift function of throttle position is represented by the contents of the register FN34S divided by the contents of register RTNOVS. This is the 3-4 upshift speed divided by the ratio of actuation N/V to the value for the base N/V that is stored in memory. Thus, the upshift speed is corrected for any variations in the actual N/V to the base calibration N/V. An inquiry is made also at step 642 to determine whether the PRNDL position is in 4. If all of the conditions indicated at the step 642 are positive, the desired gear GR_DS is set equal to 4. This action step is indicated in block 644 in FIG. 13.

If any of the conditions that are tested at step 642 is negative, the routine then proceeds to step 646 where an inquiry is made to determine whether the current gear is less than 3 and if the vehicle speed VS is greater than the 2-3 upshift function FN23S corrected by the same factor described with reference to step 642 for variation in the actual N/V value with respect to the base N/V value that is stored in memory. The N in this computation is the output shaft speed, and the V in this computation is the vehicle speed. This ratio accounts for variations in the tire size or tire diameter and axle ratio changes.

If the inquiry at step 646 indicates that the vehicle speed is greater than the corrected 2-3 upshift point, the desired gear is set to 3 as indicated in the action block 648.

If the vehicle speed is less than the 2-3 upshift speed, the routine will proceed to an inquiry of the contents at register 650 to determine whether the current gear is less than 2 and if the vehicle speed is greater than the 1-2 upshift corrected for N/V variations as before. The 1-2 upshift point is designated by the symbol FN12S. If both of these conditions are true, the desired gear GR_DS is set equal to 2 at action block 652. Thus a 1-2 upshift may occur.

The value for the ratio of the actual N/V to the base N/V, which is used to correct each of the upshift points described in this routine, is a value stored in a keep-alive memory portion of the memory (KAM) so that the data is not lost when the ignition key is turned off. In this respect, the KAM portion of the memory acts in a fashion similar to the RAM portion and is addressable in the same way as the addressing procedure for RAM.

If the inquiry at step 650 results in either of the conditions being untrue, the procedure then will not result in an upshift. In that case, the processor will address the next register where an inquiry is made, as shown at 654, to determine whether the current gear is greater than 1 and if the vehicle speed is less than the 2-1 downshift function of throttle position (FN21S). If both of those conditions are true, the desired gear is set equal to 1, as indicated in action blocks 656. If either of the conditions at step 654 is not true, the routine will then proceed to step 658 where the current gear register is addressed and an inquiry is made as to whether the current gear is greater than 2. If it is greater than 2 and if the vehicle speed is less than the 3-2 downshift point (FN32S) corrected for the ratio of actual N/V to the base N/V, then the desired gear is set equal to 2 at action block 660 and the transmission is conditioned then for a 3-2 downshift.

If either of the inquiries at step 658 is negative, the routine then proceeds to step 662 where an inquiry is made with respect to whether the current gear is greater than 3 and also whether the 4-3 downshift point is higher than the current vehicle speed corrected for N/V as explained above. If both of these conditions at step 662 are satisfied, the desired gear is set equal to 3 at action block 644. If either or both of the conditions considered at action block 662 is negative, the microprocessor will cause an inquiry to be made at step 666 to determine whether the current gear is greater than 3 and if the PRNDL position is in 3. That is, an inquiry is made as to whether the PRNDL lever has been moved from the overdrive position to the 3 position corresponding to an overdrive cancel operation. If both of the inquiries at step 666 are positive, the desired gear will be set equal to 3 at action block 664. On the other hand, if either of the inquiries in step 666 is not true, the desired gear then is set equal to the current gear and no downshift is indicated. This action occurs at action block 668. The routine then is ended. It is ended also following completion of any of the actions indicated in the action blocks 644 through 664.

Shift Control Modules (Delay/Verify Shift Logic)

The sub-module shown at 622b now will be described. After a new desired gear has been determined at action block 622a, a delay should be introduced into the sequencing to effect a predetermined amount of delay time before the new desired gear is passed through to the commanded gear module. This delay is accomplished by the delay verify shift logic module which is the next main module executed. The delay will allow TV pressure to increase before the commanding of a shift following determination of the desired gear. The beginning of the TV pressure build-up should occur prior to the shift in order to overcome the delay times that are inherent in the operation of the TV solenoid.

The delay verify shift logic will induce the necessary delay to also allow the engine rpm to decrease before a tip-out upshift is commanded. If a shift is commanded after a tip-out occurs, the shift would be harsh since the engine will not have slowed down at that instant. By waiting for a calibratable time following the determination of the desired gear and before the commanding of the shift, the shift smoothness is improved. Also, the shift delay is necessary in order to avoid unnecessary commanding of gears or to avoid the commanding of a gear when that is not appropriate. For example, if there is a temporary transient signal developed that is not a true indicator of the desired gear, the shift commanding should be delayed in order to verify that a gear change really is appropriate.

The delay logic will cause a shift delay by setting the desired gear equal to its value during the previous background pass until the delay timer has run out. After the timer expires, the desired gear no longer assumes its previous value but is allowed to pass through to the commanded gear determination logic to effect a ratio change.

FIG. 14 shows the flow diagram that illustrates the logic for the delay verify shift logic module. Following the start of this logic, an inquiry is made at step 670 to determine whether the desired gear is not equal to the desired gear that was present during the last background pass. If the flag FLG_VE_DSGR has not been cleared, and if the timer has not been cleared, then the desired gear is set equal to the same desired gear during the last background pass. This is indicated in action block 672.

If any of the three conditions at step 670 is not met, the routine then proceeds to step 674 where it is determined whether the desired gear is not equal to the desired gear for the last background pass and where the gear is verified by determining that the flag FLG_VE_DSGR is set and that the timer has expired. If that is the case, the flag FLG_VE_DSGR is cleared, as shown in action block 676. Thus, it is possible in this instance to allow the new desired gear to pass through to the commanded gear module to be described subsequently. On the other hand, if any of the conditions at steps 674 is not true, an inquiry is made at step 678 to determine whether the desired gear is greater than the gear that was desired during the last background loop and if the flag FLG_VE_DSGR is cleared, indicating that there is no shift delay in progress during that background pass. If these conditions are met, then the action set out at action block 680 takes place where the desired gear flag FLG_VE_DSGR is set and the timer is loaded for an upshift. Desired gear is set equal to the desired gear for the last background pass until the desired gear delay is completed. Also, the flag FLG_SFT_UP is set and the flag FLG_SFT_DN is cleared, which is appropriate for an upshift.

If the conditions set out in inquiry 678 are not met, the routine proceeds to step 682 which describes a downshift. It is determined at that step whether the desired gear is less than the gear that was desired during the last background pass and whether the flag FLG_VE_DSGR has been cleared, which would indicate that there is no delay in progress. If these conditions are true, the timer is loaded at action block 684 and the timer flag FLG_VE_DSGR is set. The desired gear then is set equal to the desired gear that existed during the last background loop and the flags are set to indicate a downshift.

If none of the four conditions shown at 670-682 is satisfied, then the routine is not requesting that there be a change in gear desired. Thus, the flag FLG_VE_DSGR is cleared at step 686. This is a default condition. When it exists, no shift will occur.

At step 670, it is indicated that the desired gear is not the same as the gear last desired. The shift still is being verified since the timer setting is greater than zero, in which case the desired gear is set back to the gear last desired at step 672. At step 674, it is indicated that the desired gear is not equal to the last desired gear. The flag is set and the timer has expired, which means that a shift is desired and the routine has just finished verifying it. At that point, the flag is cleared at 676.

Step 678 indicates that the shift that is desired is an upshift. The flat at that point is cleared and the routine has not yet verified the shift. Thus, the timer is loaded at action block 680, the timer's flag is set, and the gear then is set back to the desired gear during the last background pass and the upshift and downshift flags are set to indicate an upshift. If the gear change is a downshift, this occurs at step 682. Again, the flag indicates that the desired gear is not yet verified. Thus, the upshift and downshift timers at action block 684 are set for a downshift. If none of the four criteria described above is met, that means that either the desired gear did not stray changed or that a change in gear desired is not requested. In either case, the flag is cleared at step 686 an the logic will be forced to pass to a new verification procedure the next time the desired gear changes.

Shift Control Modules (GR_SEQ_PNTR Calculation)

The sub-module shown at 622c in FIG. 12 now will be described. If the desired gear is set at 4, for example, as indicated in action block 644, and if the current gear is 1 rather than 3, a multiple step upshift is indicated. A shift from 1 to overdrive can be accomplished in four different ways. The shift can be a direct 1-4 upshift, a 1-2-4 upshift, a 1-3-4 upshift or a 1-2-3-4 upshift.

The particular sequence that is followed in accomplishing such as shift is determined by a sub-module called the GR_SEQ_PNTR calculation. There is a separate calibration constant determining the interval between each shift in the shift sequence. If the desired gear is one greater than the current gear, the gear to be used in establishing an appropriate TV pressure during the shift interval is set equal to the desired gear. If the desired gear is more than one greater than the current gear, the gear that is used to set the dynamic TV pressure before the shift information is passed through to the shift command module is set to the first step of the gear shift. The gear sequence pointer GR_SEQ_PNTR is used by the commanded gear routine module to be described subsequently.

The GR_SEQ_PNTR register contains the address of a different calibration parameter for each step of a multiple-step shift. These addresses are indicated in FIG. 20 where the pointer address is listed in the left-hand column and the calibration parameter associated with that address is indicated in the middle column. Further, the possible choices available are indicated. During a 1-3 shift, the possible choices are a shift from 2 to 3 or a 3-3 shift which indicates that no shift should occur. If the desired shift is a 1-4 shift, the choices then would be a shift from 2 to 3 to 4, or a shift from 3 to 4 directly with no further change indicated, or a shift from 2 to 4, or a continuation of the fourth ratio. The fourth choice would be the 4-4-4 choice which indicates that no shift should occur during the third step of the shift.

The first three address blocks in FIG. 20 are upshift pointer addresses, and the last three pointer blocks are downshift pointer addresses, each address corresponding to a different calibration constant.

Shift Control Modules (PRNDL-Based Commanded Gear Determination)

The commanded gear is calculated in this main module based on PRNDL position. The current gear and desired gear are addressed to determine if an upshift or a downshift is required, and then a command is made to effect the next appropriate gear in the shift sequence. With the PRNDL in the 3 or overdrive position, the sequence is controlled by the calibration parameters pointed to by the GR_SEQ_PNTR register as explained previously.

Figure 15:
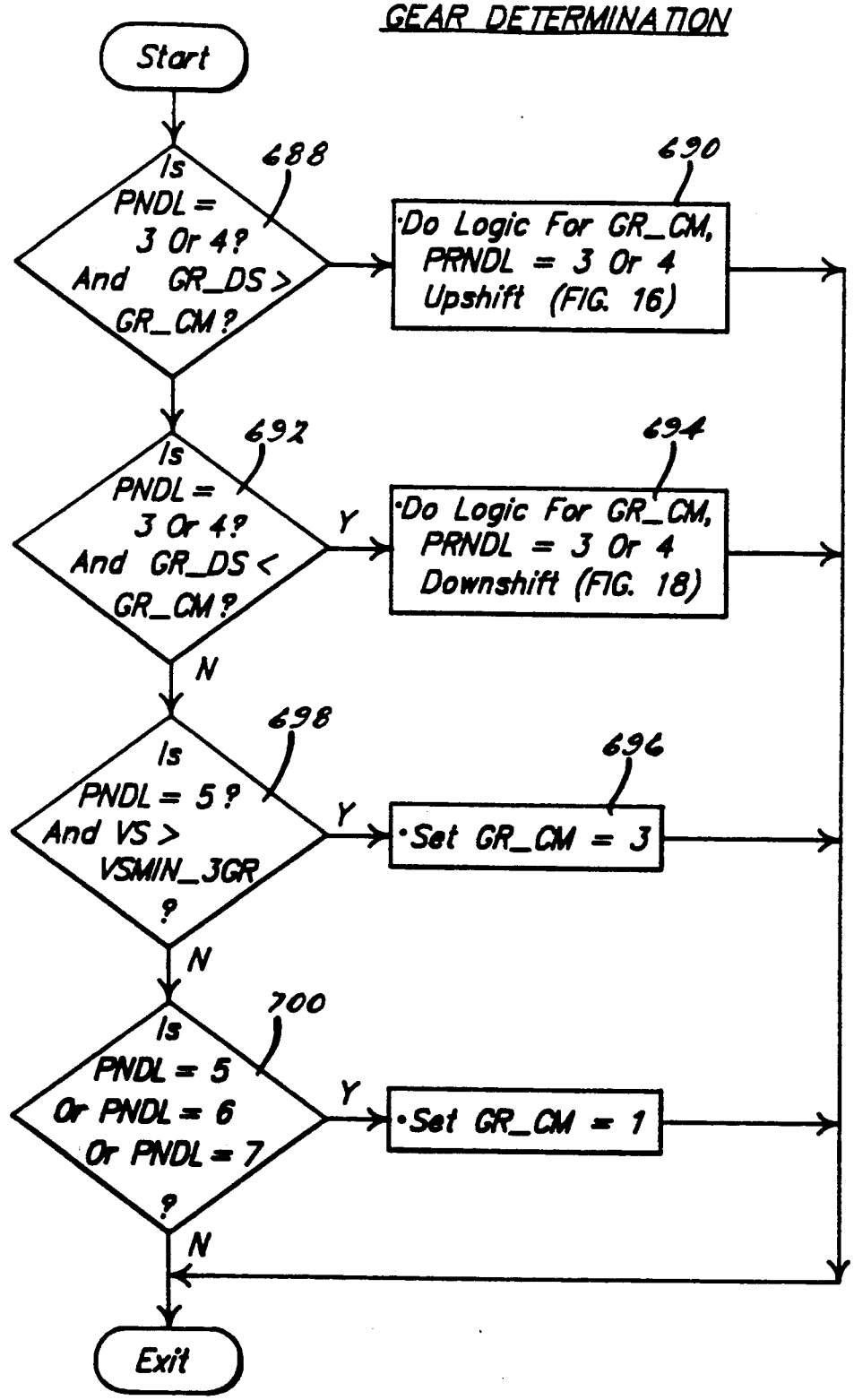
FIG. 15 is a flow chart showing the control strategy for the PRNDL-Based Commanded Gear Determination module.

The flow chart of FIG. 15 illustrates the control logic for this module. Before the beginning of this logic, the gear commanded last is always set equal to the current gear being commanded. The last gear commanded was stored in temporary memory and fetched and compared to the current gear being commanded. At that point, the logic will determine whether action should be taken to carry out gear commanded logic if a change has been made from the gear commanded in the last background pass.

If the PRNDL position is 3 or 4 and the desired gear is greater than the gear commanded, an upshift is being requested. These two conditions are indicated in FIG. 15 at step 688. If the conditions at step 688 are true, the logic is performed for the gear commanded when the PRNDL position is 3 or 4, which will effect an upshift as will be explained subsequently. This occurs at action block 690. If the PRNDL position is 3 or 4 and the desired gear is less than the gear commanded, which are the conditions set forth in step 692 in FIG. 15, the logic is carried out for a commanded gear downshift with the PRNDL position in 3 or 4. This is indicated at action block 694.

If neither of the sets of conditions at 688 and 692 is true, and if the PRNDL position is 5, which is a neutral condition, and if the vehicle speed is greater than a calibratable minimum value for third gear, the commanded gear is set equal to 3, as indicated in action block 696. The conditions that lead to the action at 696 are shown at step 698.

If the PRNDL position is in the reverse park, which correspond respectively to numerals 6 and 7 at step 700, and if conditions set forth at step 698 are not true, the routine will then set the commanded gear equal to 1.

Shift Control Modules (GR_CM_PRNDL Equal 3 Or 4 Upshift Module)

The commanded gear on an upshift is determined by this module when PRNDL=3 or 4. The sequence for multiple-step shifts is calibratable, as explained previously with respect to the description of the GR_SEQ_PNTR module. The time spent in intermediate gears on a multiple-step shift is controlled by this module.

Figure 15A:
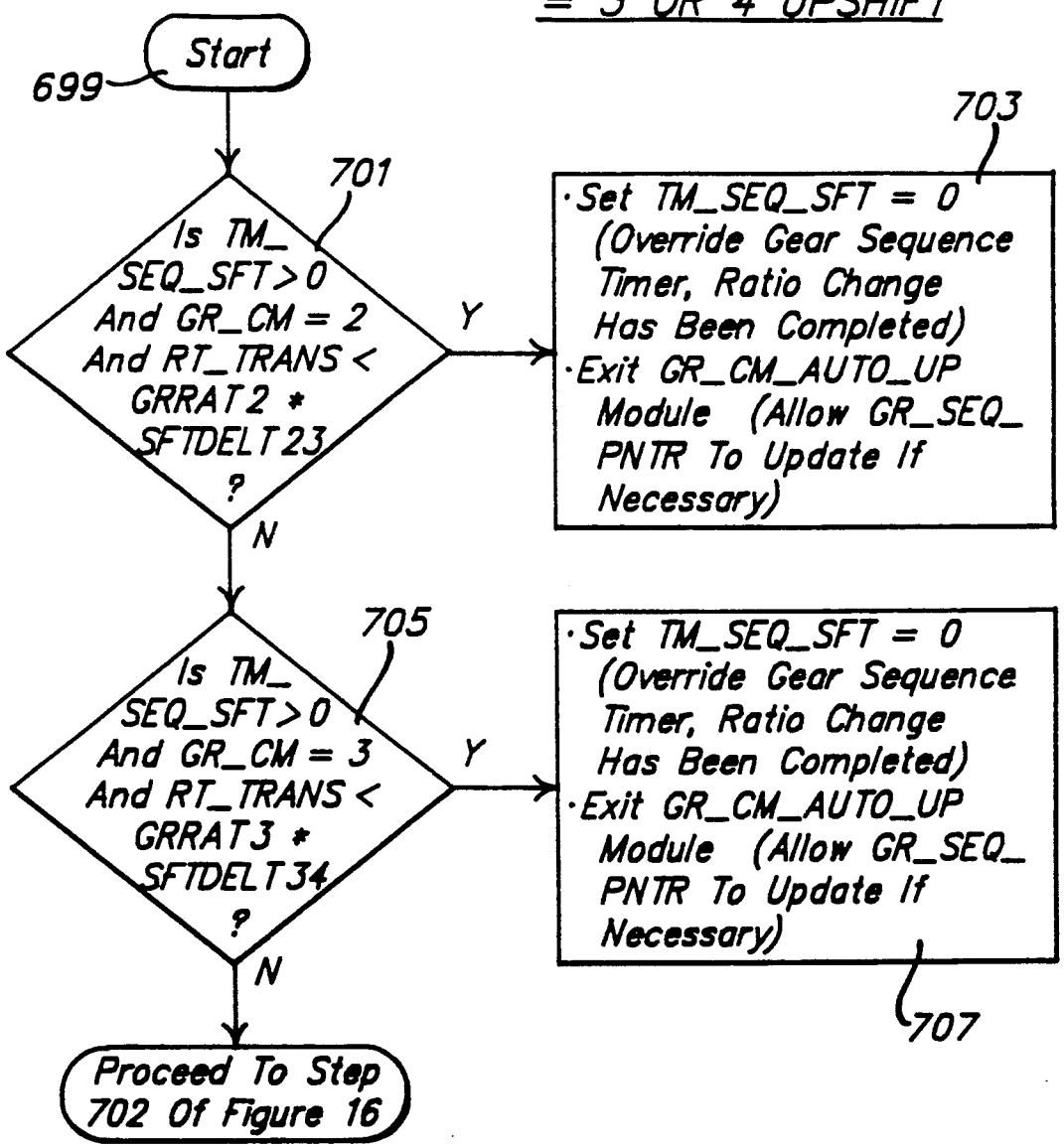

The flow charts of FIGS. 15a and 16 illustrate the sequence of steps for this module. In FIG. 15a, the routine begins at step 699 and proceeds to make an inquiry at step 701 to determine whether the sequence timer TM_SEQ_SFT is greater than zero. That is, a check is made to determine whether the time still is running. It is determined also whether the gear commanded is 2 and whether the number in register RT_TRANS, which is a register containing the transmission gear ratio, is less than the second gear ratio GRRAT2 times the calibration constant SFTDELT23. This value of gear ratio is a calibrated ratio. It is compared to the value for second transmission ratio RT_TRANS, thus making possible a determination if the 1-2 shift has been sufficiently complete so that a command of a 2-3 shift can be initiated before the 1-2 shift actually is fully completed.

If the conditions indicated at step 701 are true, the routine proceeds to action block 703 where the sequence timer TM_SEQ_SFT is cleared. The gear sequence timer count is thus overridden so that the routine will act as though the ratio change already has been completed. Thus, the sequence timer TM_SEQ_SFT acts as a default timer which allows the shift sequence to proceed if it has not previously been overridden by the effect of the data fetched from the register RT-TRANS.

After the sequence timer TM_SEQ_SFT has been cleared, the routine exits. If necessary, a special procedure may be used for allowing the module GR_SEQ_PNTR to update the gear sequencing information.

If the inquiries at step 701 are not all true, the routine will proceed to make an inquiry at step 705 with respect to the next step of the multiple ratio shift. It is determined at 705 whether the gear commanded is 3 and whether the count of the sequence timer TM_SEQ_SFT is greater than zero. As in the case of the previous routine at step 701, a check is made to determine whether the transmission ratio RT_TRANS is less than the gear ratio corresponding to the commanded gear (third gear) times the calibration constant for shift delay, SFTDELT34. This means that the routine at 705 will determine whether a 2-3 shift has been sufficiently complete in advance of expiration of the timer value in the default timer TM_SEQ_SFT for a shift command to take place indicating a 3-4 upshift. If the inquiries at step 705 are positive, again the sequence timer TME_SEQ_SFT will be cleared, thus overriding the normal gear sequence timer function. Again, the timer TM_SEQ_SFT acts as a default timer which will allow a 3-4 upshift command when it is cleared fi it has not previously been cleared by the preceding steps. The setting of the time occurs at action block 707.

If the inquiries at step 705 are not true, the routine will proceed to step 702 of FIG. 16.

An inquiry is made at step 702 to determine whether the flag delay commanding a gear change is set. This flag will be cleared upon exiting this routine from the last shift. At the beginning of a new routine, therefore, the flag is set as shown at action block 706, following a check at step 704, and the delay shift timer is set to TMDELUP. Thus, at step 702, a check is made to determine whether the shift delay timer is run down and to determine whether the flag commanding an upshift has been set. If the timer is running, the routine exits as indicated. Similarly, if the sequence timer TM_SEQ_SFT is still running, as indicated at step 708, the routine also will exit.

The value TMDELUP for the delay shift timer is a value that is incremental to the timer value for timer TM_SEQ_SFT for each shift during a multiple step shift. That incremental timer value is added to the shift delay time as will be explained earlier, the sequence timer can be cleared by being overridden at steps 703 or 707.

If the flag FLG_DE_CMGR is set, as shown at 710, and a time delay shift timer has expired, as indicated also at step 710, then the flag FLG_DE_CMGR is cleared and the commanded gear is set equal to the contents of the address pointed to by the gear sequence pointer and the pointer is incremented to point to the next gear in sequence. That is followed by the upshift delay sequence routine. This action is set forth in action block 712 of FIG. 16.

Figure 17:
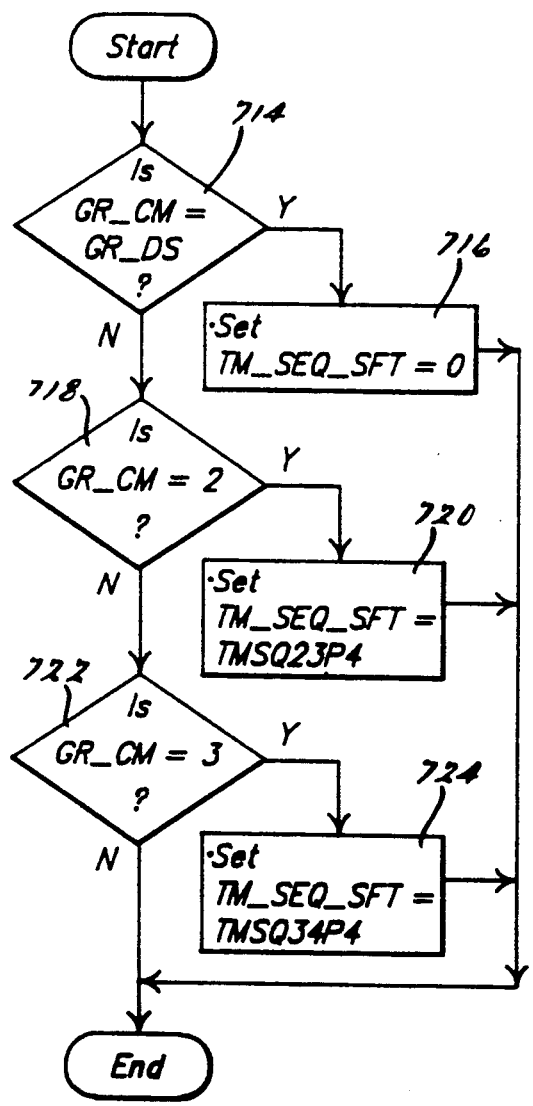
FIG. 17 is a flow chart showing the control strategy for the Upshift Delay Logic module.

The upshift delay logic is set out at FIG. 17. If the commanded gear is equal to the gear desired as indicated at step 714, that means that either a single step shift has occurred or the last step of a shift sequence has occurred. If that is true, then the sequence timer is cleared, since no sequencing is required further, as indicated in action block 716. On the other hand, if the gear commanded is equal to 2, as indicated at step 718, this indicates that the routine is performing a 1-2 upshift as part of the multiple-step shift. The reason this is the first step of a multiple-step shift rather than a mere upshift into the second gear is because even though the commanded gear is 2, it is not equal to the gear desired. The gear desired is higher than 2 in this instance. Thus, the sequence timer must be set and this is done at action block 720. Then the routine exits as indicated in the diagram of FIG. 17.

If the gear commanded is 3, as indicated in the step 722, this indicates that the routine is sequencing a 3-4 upshift. In that case, since the inquiry that occurs at step 722 is positive, the sequence timer for a 3-4 upshift is set as indicated at action block 724. This timer controls the shift time during a shift sequence from 3 to 4 on a multiple-step upshift, just at the timer at action block 720 controls the time for a 2-3 upshift during a multiple-step upshift.

Figure 18A:
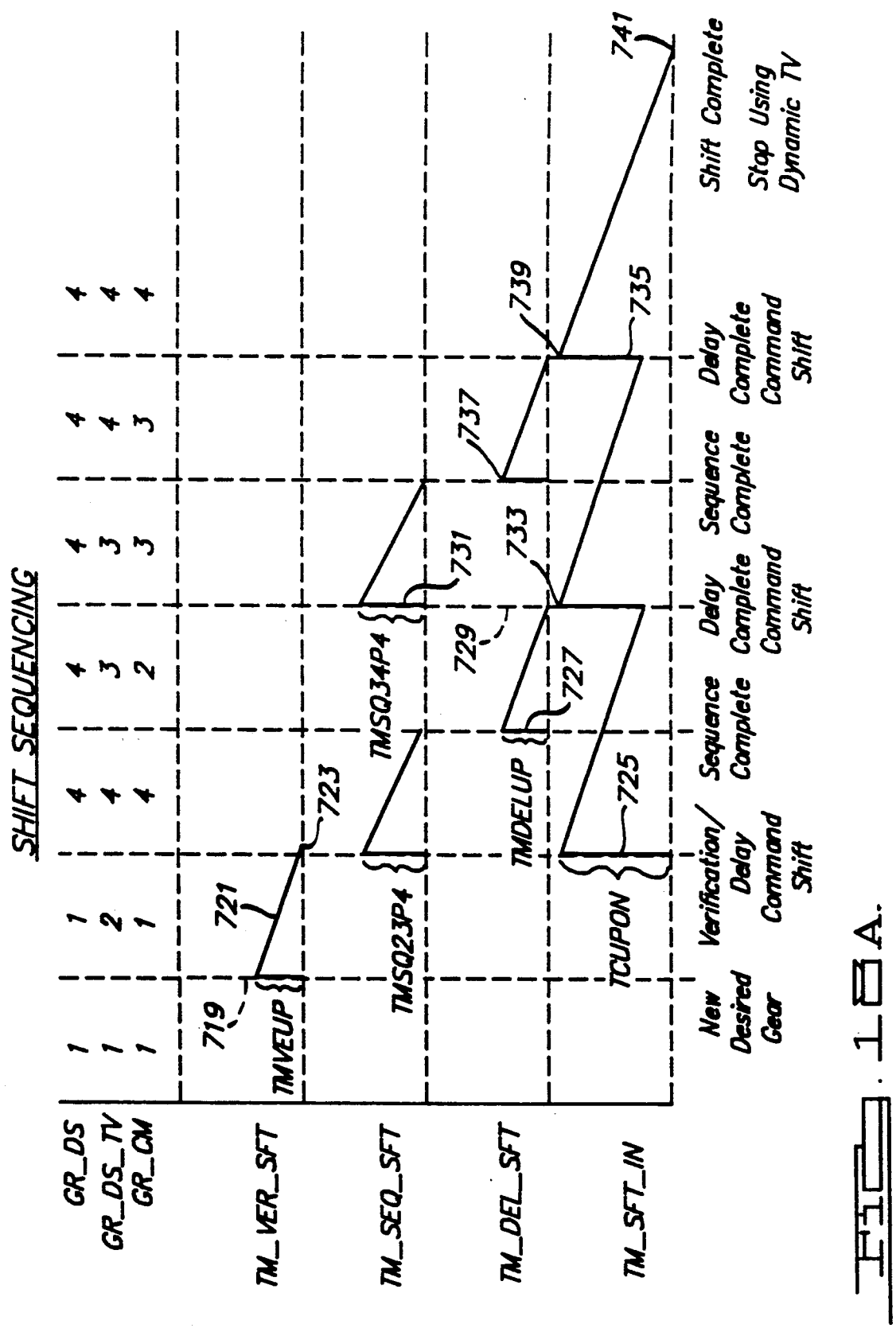
FIG. 18A is a chart showing the shift scheduling for a commanded gear upshift starting with the lowest ratio and continuing to the overdrive ratio.

The behavior of the timers during the shift sequencing of a multiple step upshift is graphically illustrated in FIG. 18a. In the left column of FIG. 18a, the various timers are identified. These are the shift verify timer TM_VER_SFT, the shift sequence timer TM_SEQ_SFT, the shift delay timer TM_DEL_SFT, and the shift in progress timer TM_SFT_IN. The ratio values for each step of a multiple step shift are indicated as gear desired GR_DS and gear commanded GR_CM. For each of the desired gears, there is a TV value represented by the register GR_DS_TV.

If the gear desired, the gear commanded and the gear desired TV all correspond to the first gear ratio as indicated on the left-hand column of FIG. 18a and a new desired gear is determined indicating a 1-4 upshift, the shift verify timer TM_VER_SFT is set as indicated at 719. The value for the timer is equal to TM_VE_UP. During the time represented by the sloping line 721, the timer permits the processor to verify that a shift to the fourth ratio is desired or appropriate. A TV adjustment appropriate for second gear is made at that instant in advance of the command of second gear. After the timer runs down at point 723, the first step of the shift is commanded; that is, a shift from the first ratio to the second ratio is commanded. The first step of the multiple ratio shift is commanded at 723, and timer TM_SEQ_SFT is set to a value TMSQ23P4, which indicates the time to be spend in second gear before a 2-3 shift begins. At the same time, the shift in progress flag is set to a value equal to TCUPON as shown in FIG. 18a at 725. When the shift sequence timer is run down, the delay shift timer TM_DEL_SFT is set to a value equal to TMDELUP as indicated at 727. This permits the processor to set the TV value that is appropriate for a 2-3 shift. This occurs in advance of the command of the shift to permit the TV pressure to assume its new value before this shift is complete as shown at 729. The 2-3 shift is commanded at 729 after the time TCUPON expires.

When the shift in progress timer runs down and a 2-3 shift is commanded, the sequence shift timer TM_SEQ_SFT is set at a new value equal to TMSQ3P4 as shown at 731. Further, shift in progress timer TM_SFT_IN is reset as shown at 733. This timer is set a value that runs through to point 735, at which time the 3-4 gear shift delay is complete. Prior to that time, however, the time delay shift timer TM_DEL_SFT is reset as shown at 737, thus allowing the TV to assume its appropriate value for fourth gear. As in the case of the other shifts, the TV is adjusted in advance of the completion of the 3-4 shift.

After the 3-4 shift is commanded at 739, the shift in progress timer, which is set at 739, runs down to tis ultimate zero value at 741. At that time, the 3-4 shift is complete.

Shift Control Modules (Commanded Gear PRNDL=3 Or 4 Downshift Logic)

This module determines a commanded gear on a downshift when PRNDL=3 or 4. On multiple step shift, the sequence for each shift of the multiple-step shift is calibratable using the GR_SEQ_PNTR calculation procedure, as explained previously.

This module determines the time that is spend in the intermediate gears of a multiple-step shift.

The routine of FIGS. 17A and 18 is comparable to the routine of FIGS. 15A and 16, but it is distinguished because provision must be made for unlocking the converter during downshifts. All downshifts are made with an open converter so the converter clutch must be disengaged. Thus, the first step of the routine of FIG. 18 shown at step 726 involves an inquiry to determine whether the timer that controls the unlocking of the converter will permit an unlock to occur. If it will, the flag calling for an unlocking of the converter is set in action block 728 where flag FLG_UNLK_DES is set.

As seen in FIG. 17A, following step 728 of FIG. 18, the routine proceeds as indicated at 727 in FIG. 17A. An inquiry is made at step 743 of FIG. 17A to determine whether the shift sequence timer TM_SEQ_SFT is still running and whether the commanded gear for the shift solenoids is equal to 3. a check also is made to determine whether the transmission gear ratio is greater than the gear ratio for third gear times the calibration constant SFTDELT32 for the 4-3 downshift. If the gear ratio multiplied by that calibration constant is less than the transmission ratio, the shift sequence timer is forced to its zero state which overrides the gear sequence timer operation that normally would be in effect. This would indicate that the 4-3 downshift is sufficiently complete to enable the routine to continue. If the shift sequencing timer is zero, the routine exits as in the case of the 3-4 upshift routine described previously. This action is set out in action block 745 of FIG. 17A.

If any of the three conditions set out at step 743 is not true, the routine will proceed directly to step 747 where an inquiry is made in a manner similar to the inquiry at step 743. In the case of step 747, the inquiry is to determine whether the gear sequencing timer is still running and whether the commanded gear is two and, further, whether the gear ratio is greater than the gear ratio for second gear operation multiplied by a calibration constant SFTDELT21. If the conditions at step 747 are satisfied again, the gear sequencing timer TM_SEQ_SFT is set to zero, overriding the gear sequence timer function. This would indicate that the ratio change from 3 to 2 is sufficiently complete to enable the routine to continue. This action is set out in action block 749. After the gear sequencing timer is set to zero, the routine exits as indicated in action block 749.

If conditions set out at step 747 are not all true, the routine will proceed to step 730 of FIG. 18.

At step 730 in FIG. 18, an inquiry is made to determine whether the shift delay timer flag on the first pass through the routine is set and whether the shift delay timer TM_DEL_SFT is running. If both of these conditions are true, the routine then exits. If either of these conditions is not true, a check is made at step 732 to determine whether the converter clutch unlock timer TM_UNLK_CONV is less than the calibrated timer value TMDNUN. If the converter clutch timer has not run down, the routine then exits. In that case, there is no change in gear commanded. Otherwise, if the delaying of the shift is finished and the shift command delay flag is set as indicated at step 734, or if flag unlock desired is set as indicated at step 736, then the flag unlock desired FLG_UNLK_DES is cleared as indicated at action block 738 and the shift command delay flag is cleared, indicating that the shift delay time is expired. Further, the commanded gear is set equal to the contents of the address pointed to by the gear sequence pointer GR_SEQ_PNTR and the pointer is then incremented to point to the next gear in sequence. If action block 738 is reached during the routine, the downshift delay logic is performed. After that occurs, the routine exits, as indicated in FIG. 18.

If any of the conditions at steps 734 and 736 is not true, and inquiry is made at step 740 to determine whether the shift delay timer flag FLG_DE_CMGR is clear. If it is clear, it is set at action block 742, and the timer TM_DEL_SFT for delaying the shift to permit a TV pressure build-up to occur is set equal to the calibrated value TMDELDN. This is indicated at action block 742. The routine then exits, as indicated.

Figure 19:
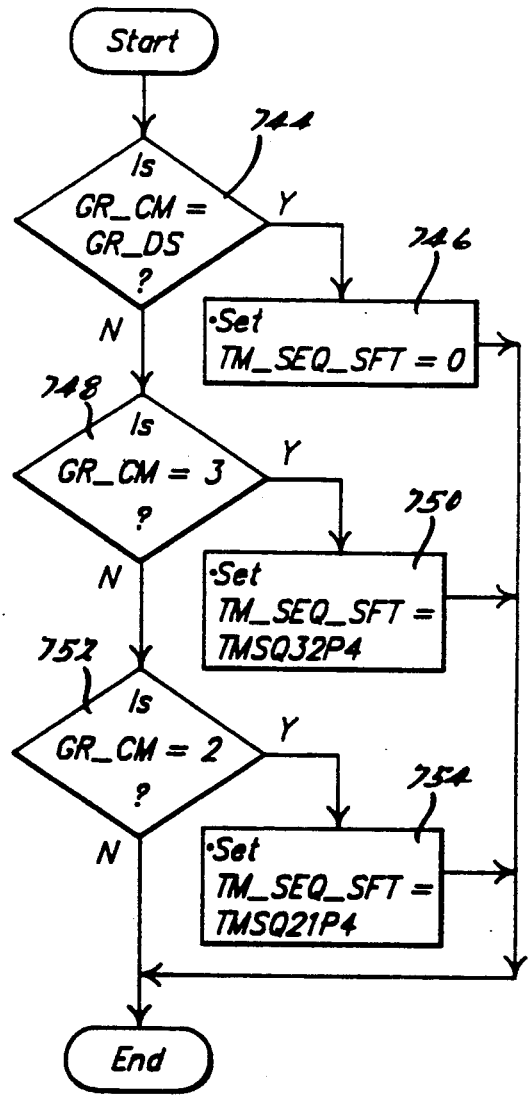
FIG. 19 is a flow chart showing the control strategy for the Downshift Delay Logic module.

If the downshift delay logic indicated at action block 738 is to be carried out, the steps shown in the flow chart of FIG. 19 are executed.

As shown in FIG. 19, a check is made at step 744 to determine whether the gear commanded is equal to the gear desired, which would indicate that the controller is executing a single step downshift or is executing the last step of a sequenced downshift. If that is true, the sequence timer can be cleared as shown in action block 746. If the gear commanded is 3, as shown in step 748, that means that the controller is executing a 4-3 downshift as part of a sequenced downshift, and it is necessary to set the shift sequence timer value equal to TMSEQ32P4, as indicated at action block 750. This sets the maximum amount of delay during the portion of the shift sequence when the transmission changes ratio from 3 to 2. The ratio change actually will occur, however, when the shift sequence timer is overruled as the gear ratio RT_TRANS reads the calibrated gear ratio value stored in memory as explained previously.

If the routine proceeds to a point where the gear commanded is 2, an inquiry is made to determined whether the gear commanded in face ib '. This occurs at step 752. If the inquiry is positive, then the transmission is performing a 3-2downshift as part of a multiple-step downshift which requires the sequence delay timer to be set at action block 754 so that it will equal a value TMSQ21P4. After that occurs, the routine exits as indicated.

Shift Control Modules (Commanded Gear PRNDL=3 or 4 Downshift Logic—3-2 Downshift Control)

A special strategy is used to establish optimum shift quality during a 3-2 downshift. This will be an expansion of the general description dealing with the shift solenoid states at the beginning of this specification. The special control routine that is used involves calibratable times for release of the direct clutch and application of the low-and-intermediate servo. Separate calibratable times are provided for power-on 3-2 downshifts and for power-off 3-2 downshifts. This procedure requires control of the solenoid state for the two shift valve solenoids 462 and 464, hereinafter referred to as SS3. The timing requires the use of a high speed foreground microprocessor control loop to precisely time the synchronous action of the release of the direct drive clutch and the application of the low-and-intermediate servo during 3-2 downshifts. The downshift control is more effective if the high speed foreground control loop, also known as the millisecond repeater control loop, is used rather than the longer background control loop.

As explained previously with respect to the valve circuit diagrams of FIGS. 4a through 4d, the state of the solenoids will determine the positions of the two shift valves 482 and 480 as well as the position of the forward clutch control valve 372. When the transmission is conditioned for third gear operation and the transmission is operating in steady state with no shift occurring, solenoid SS1 is OFF, solenoid SS2 is OFF, and solenoid SS3 is ON, provided the PRNDL lever is in the overdrive position. This condition is described, furthermore, in FIG. 11 where it is shown that during operation with the PRNDL lever in the overdrive position, third gear operation with engine braking is available when solenoids SS1, SS2 and SS3 are OFF, OFF and ON, respectively.

In order to effect a power-on downshift to the second ratio, it is necessary, as explained previously, to apply the low-and-intermediate servo in synchronism with the release of the direct drive clutch. That requires solenoids SS1, SS2 and SS3 to be ON, ON and OFF, respectively, as indicated in FIG. 11. This solenoid state is the final state after the 3-2 downshift is completed.

Figures 21, 21A:
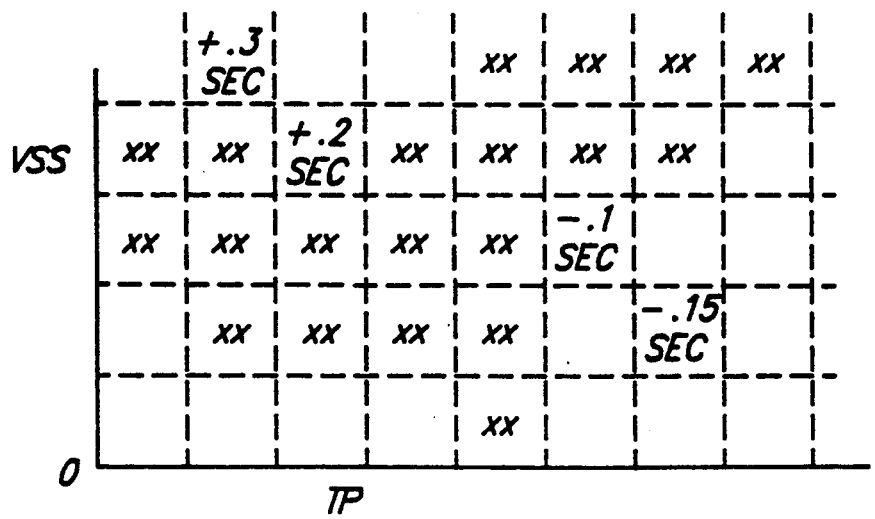
FIG. 21 is a chart showing the various solenoid states for various downshift conditions on a 3-2 downshift.
FIG. 21A is a table in memory showing the timing calibration constants as a function of vehicle speed and throttle position during a 3-2 downshift.

In FIG. 21, I have illustrated the initial state that will effect third gear operation as well as the final state that will effect second gear operation. Intermediate the initial state in which the solenoids are conditioned for third gear operation and the final state in which the solenoids are conditioned for second gear operation, there are two intermediate states. These are identified in FIG. 21 as the first state and the second state. The shift duration is divided into these segments so that the two intermediate states occur, one after the other, during the shift to modify the shift timing, thus effecting maximum smoothness in the 3-2 downshift.

During normal operation in the second ratio as explained with reference to the valve circuit diagrams of FIGS. 4a through 4d, the application of the low-and-intermediate servo and the release of the direct drive clutch will result in second gear operation. In the first state identified in FIG. 21, the low-and-intermediate servo apply pressure is present, but it is a regulated pressure. It is maintained at a value intermediate the value for the initial state, and the value required to fully engage the low-and-intermediate brake. Also, as explained previously with respect to FIG. 4d, the engagement valve 362 is shifted to the left against the force of the valve spring, thereby permitting regulated lien pressure from the 3-2 servo regulator valve 406 to pass through the engagement valve whereby regulated pressure is distributed to the apply side of the low-and-intermediate brake B2. Furthermore, as explained earlier with referenced to FIG. 4d, the engagement valve is moved to the left under the influence of line pressure in passage 360. Thus, following the initial state indicated in FIG. 21, the first state indicated in FIG. 21 is characterized by partial engagement of the low-and-intermediate brake B.

The next state, which is identified in FIG. 21 as the second state, results from the transition of solenoids SS2 and SS3 from the OFF condition to the ON condition. This will cause the 2-3 shift valve to shift in a left-hand direction, thus causing the forward clutch control valve to shift in a left-hand direction. This will cause the forward clutch to become exhausted as well as the release side of the low-and-intermediate servo, as explained previously. Also as explained previously, this introduces orifice 466 and orifice 444 into the exhaust flow path for the fluid for the direct clutch and the release side of the intermediate servo. The calibration of the orifices will control the timing of the release of the direct clutch and the application of the low-and-intermediate brake B2.

When the final third state is reached during the shift, solenoid SS3 is turned OFF while the other two solenoids remain ON. This will cause orifices 445, 444 and 430 to control the exhaust of fluid from the direct clutch and the exhaust of fluid from the low-and-intermediate servo release pressure chamber, thereby effecting a different rate of completion of the 3-2 shift.

The relationship of the condition of the solenoids to the functions of the orifices during the control of the release of the direct clutch and the application of the low-and-intermediate brake are illustrated at FIG. 22.

It is seen in FIG. 22 that the orifice that controls the rate of release of fluid from the release side of the low-and-intermediate brake servo may be orifice 446 or orifice 430 depending upon whether SS3 is ON or OFF. Likewise, orifice 445 is introduced into the exhaust flow path for the direct clutch and the low-and-intermediate servo release pressure chamber whenever SS3 is OFF, but that flow path is not available when SS3 is ON. On the other hand, orifice 444 is available to control the exhaust of fluid from the direct drive clutch and the low-and-intermediate servo release chamber when SS3 is either ON and OFF. It is apparent, therefore, that the state of the solenoids can be controlled by divide the 3-2 shift interval into three segments. By controlling the timing of the solenoids, the timing of the three downshift state thus can be controlled.

Because of the short duration of each of the states of the 3-2 downshift solenoids, a faster foreground microprocessor control loop is required. In the first step of the strategy for controlling the three solenoids, a check is made to determined whether the gear commanded during the last background pass is equal to three. A clock time at the instant the 3-2 downshift is commanded is captured and stored in temporary memory, which records the time that the sequencing through the various downshift states begins. In the next step of the strategy, the processor will point to a table in a memory register to select and assign a time for the shift to be completed. This information is obtained from a table such that shown in FIG. 21A where throttle position is plotted against vehicle speed. The processor then will check to determine whether the value fetched from the table in FIG. 21A is positive or negative. If it is negative, a flag is set. This will initiate a solenoid state control routine that will be described later. If the value is stored in the table and fetched is positive, that flag is cleared and the routine will then exit to the next control routine. The 3-2 downshift control then is finished.

In the next step of the routine, the absolute value that is fetched from the table of FIG. 21A is stored in temporary memory after it is converted from seconds to clock ticks by the use of an appropriate conversion factor. The value thus computed is a target time for the control of the solenoids 551 and 552. A similar procedure is used for establishing a target time for the control of solenoid 553.

The target times thus established are stored in memory for addressing during the high speed foreground control loop. If the target time for a power-on 3-2 downshift control measured in clock ticks equals the stored value, and the previously described flag indicates a negative reading in the table of FIG. 21A, the flags are conditioned to turn SS1 ON and to turn OFF SS2. After the clock becomes greater than the target values, the flags for controlling SS1 and SS2 are both set, thus causing SS1 and SS2 to be turned ON. This causes a change to the second state for the downshift as indicated in FIG. 21.

The control of the solenoid SS3 is done in the same fashion. As previously explained, a separate time value is computed using the information fetched from the table 21A in memory. If the clock value for SS3 is greater than its target value, the flag controlling SS3 is cleared and that results in SS3 being turned OFF. That causes the downshift state to change from the second state to the third state as indicated in FIG. 21.

If the 3-2 downshift is a power-off 3-2 downshift, rather than a power-on 3-2 downshift, separate calibration constants are used. If the downshift is a power-off downshift, a power-off mode flag is cleared. In that case, a power-off 3-2 downshift control logic will be carried out in a manner similar to the previously described 3-2 control shift logic except that different target times will be computed based upon the information that is fetched from the table of FIGS. 21A in memory.

Having described a preferred embodiment of out invention, what we claim and desire to secure by United States Letters Patent is:

1. An electronic control system for a multiple-ratio transmission for an automotive vehicle having a throttle controlled engine comprising gearing, pressure operated clutch and brake servos adapted to establish and disestablish multiple ratios, such establishment and disestablishment of said multiple ratios defining ratio shift points, a pressurized valve system comprising a valve circuit having multiple, interactive shift control valve elements that communicate with said servos, each valve element having two pressure distribution positions;

solenoid valve means in said circuit for distributing selectively to said shift control valve elements a fluid pressure signal for actuating said shift control valve elements, each shift control valve element having a separate fluid pressure distribution pattern for each of its two pressure distribution positions;

an electronic processor having a memory portion, said memory portion including information storage registers, shift control information being stored in said storage registers, said information including functional relationships between throttle position and vehicle speed that determine said shift points;

vehicle speed and throttle position sensor means communicating with said processor for developing ratio shift controlling signals for said solenoid valve means, said signals being established by said processor in response to the determination of the functional relationship between the values of sensed speed and throttle position as said shift control information in said memory is addressed;

desired gear determination means for establishing gear ratios in accordance with said functional relationship;

manual vale means for manually selecting a pressure distribution pattern in said valve circuit whereby said shift control valve elements are conditioned for automatic torque ratio selection in any of several ranges of ratios depending upon the magnitudes of the speed and throttle position;

shift command means for commanding a ratio change determined by said desired gear determination means; and means for controlling the time required to perform a change in ratio in response to a variation in the relative magnitude of said signals to effect optimum shift smoothness, said time controlling means establishing shift time delay values of each ratio step in a range of ratio changes, said processor comprising a central processor control means for sequencing the operation of said time controlling means after a gear ratio is established by said desired gear determination means and before said ratio change is commanded by said shift command means.

2. A control system as set forth in claim 1 wherein said solenoid valve means and said processor include means for establishing ratio changes in multiple steps from one ratio to another within a range of ratios selected during said manual ratio selection, each ratio change corresponding to a unique time delay established by said time controlling means.

3. The combination as set forth in claim 2 wherein said ratio changes comprise a change from a low gear ratio to a higher gear ratio, thus effecting an automatic upshift.

4. The combination as set forth in claim 3 wherein said processor includes discrete control modules that are sequentially addressed and executed during each background pass of the shift control routine including a shift control module adapted to determine, in response to throttle position and vehicle speed functions, a desired gear upon a change in the magnitude of said ratio shift controlling signals;

said shift command means comprising a shift command module in said processor adapted to be addressed after execution of the functions of said shift control module, the output of said shift command module being received by said solenoid valve means, said shift command module including timer means for determining the optimum timing of the actuation of said shift controlling valve elements on both upshifts and downshifts.

5. The combination as set forth in claim 2 wherein said ratio changes comprise a change from a high gear ratio to a lower gear ratio, thus effecting an automatic downshift.

6. The combination as set forth in claim 2 wherein said process includes discrete control modules that are sequentially addressed and executed during each background pass of the shift control routine including a shift control module adapted to determine, in response to throttle position and vehicle speed functions, a desired gear upon a change in the magnitude of said ratio shift controlling signals;

said shift command means comprising a shift command module in said processor adapted to be addressed after execution of the function of said shift control module, the output of said shift command module being received by said solenoid valve means, said shift command module including timer means for determining the optimum timing of the actuation of said shift controlling valve elements on both upshifts and downshifts.

7. The combination as set forth in claim 6 wherein said processor includes a timing delay and shift verification module adapted to be addressed in sequence during each background pass of said processor between the execution of the sequence steps of said shift control module and the execution of the sequence steps of said shift command module;

said timing delay and shift verification module including timer means with a calibratable time constant for preventing a shift instruction in said processor from being passed through to said shift command module until a calibratable shift verification time has elapsed, thus interrupting temporarily a shift routine.

8. The combination as set forth in claim 7 wherein said timing delay and shift verification module includes means for setting a gear desired calculated by said shift control module to the corresponding value calculated by said shift control module during a preceding background pass until said timer means time constant expires.

9. The combination as set forth in claim 1 wherein said ratio changes comprise a change from a low gear ratio to higher gear ratio, thus effecting an automatic upshift.

10. The combination as set forth in claim 1 wherein said ratio changes comprise a change from a high gear ratio to a lower gear ratio thus effecting an automatic downshift.

11. The combination as set forth in claim 1 wherein said speed sensor means is adapted to develop a speed signal that is determinative of vehicle speed.

12. An electronic control system for a multiple-ratio transmission for an automotive vehicle having a throttle controlled engine comprising gearing, pressure operated clutch and brake servos adapted to establish and disestablish multiple ratios, such establishment and disestablishment of said multiple ratios defining shift points, a pressurized valve system comprising a valve circuit having multiple, interactive shift control valve elements that communicate with said servos, each valve element having two pressure distribution positions;

solenoid valve means in said circuit for distributing selectively to said shift control valve elements a fluid pressure signal for actuating said shift control valve elements, each shift control valve element having a separate fluid pressure distribution pattern for each of its two pressure distribution positions;

an electronic processor having a memory portion, said memory portion including information storage registers, shift control information being stored in said storage registers, said information including a functional relationship between throttle position and vehicle speed that determines said shift points;

vehicle speed and throttle position sensor means communicating with said processor for developing ratio shift controlling signals for said solenoid valve means, said signals being established by said processor in response to the determination of the functional relationship between the values of sensed vehicle speed and throttle position as said shift control information in said memory is addressed;

manual valve means for manually selecting a pressure distribution pattern in said valve circuit whereby said shift control valve elements are conditions for automatic torque ratio selection in any of several ranges of ratios depending upon the magnitudes of the vehicle speed and throttle position; and means for controlling the time required to perform a change in ratio in response to a variation in the relative magnitude of said signals to effect optimum shift smoothness, said time controlling means establishing shift time delay values for each ratio step in a ratio change;

said processor including discrete control modules that are sequentially addressed and executed during each background pass of the shift control routine including a shift control module adapted to determine, in response to throttle position and vehicle speed functions, a desired gear upon a change in the magnitude of said sensed ratio shift controlling signals;

a shift command module in said processor adapted to be addressed after execution of the functions of said shift control module, the output of said shift command module being received in by said solenoid valve means, said shift command module including timer means for determining the optimum timing of the actuation of said shift control valve elements on both upshifts and downshifts.

13. The combination as set forth in claim 12 wherein said processor includes a timing delay and shift verification module adapted to be addressed in sequence during each background pass of said processor between the execution of the sequence steps of said shift control module and the execution of the sequence steps of said shift command module;

said timing delay and shift verification module including timer means with a calibratable timer constant for preventing a shift instruction in said processor from being passed through to said shift command module until a calibratable shift verification time has elapsed, thus interrupting temporarily a shift routine.

14. The combination as set forth in claim 13 wherein said timing delay and shift verification module includes means for setting a gear desired calculated by said shift control module to the corresponding value calculated by said shift control module during a preceding background pass until said timer means time constant expires.

15. The combination as set forth in claim 12, wherein said processor includes a sub-module that is addressed following said desired gear determination, said sub-module including means for selecting one of several sequences of shifts in a multiple step shift within a range of ratios selected by said manual valve means;

said time controlling means establishing shift time delay values for each ratio step in said range of ratios including a multiple-step ratio change.

16. The combination as set forth in claim 7 wherein said speed sensor means is adapted to develop a speed signal that is determinative of vehicle speed.

17. An automatic transmission for an automatic vehicle having a throttle controlled engine comprising multiple ratio gearing defining multiple torque flow paths;

pressure operated clutch and brake means for establishing and disestablishing said torque flow paths, such establishment and disestablishment of said torque flow paths defining ratio shift points;

an automatic ratio controlling valve system having shift control valve portions with interactive valve elements communicating with a pressure source and said clutch and brake means, solenoid valve means in said valve system for distributing selectively to said shift control valve portions a fluid pressure signal to actuate said shift valve elements between two pressure distribution positions;

an electronic processor having a memory portion, said memory portion including information storage registers, shift control information being stored in said storage registers, said information including functional relationships between throttle position and vehicle speed that determine said shift points;

means for sensing vehicle speed and throttle position communicating with said processor for developing ratio shift controlling signals for said solenoid valve means;

said processor including several discrete modules that are sequentially addressed including a module having means for addressing said information in said memory and effecting a desired gear computation establishing said shift points in response to a determination of the functional relationship between the values of vehicle speed and throttle position;

manual valve means for manually selecting a pressure distributed pattern in said valve system whereby said shift control valve elements are conditioned for automatic torque ratio selection of any of several ratios in ranges of ratios depending upon the magnitude of the vehicle speed and throttle position;

said processor including a sub-module that is addressed following said desired gear computation including means for selecting one of several sequences of shifts in a multiple step shift within the range of ratios selected by said manual valve means; and means for controlling the time required to perform a change in ratio in response to a variation in the magnitude of said shift controlling signals to effect optimum shift smoothness, said time controlling means establishing shift time delay values for each ratio step in said range of ratios including a multiple step ratio change.

18. The combination as set forth in claim 17 wherein said ratio changes comprise a change from a low gear ratio to higher gear ratio, thus effecting an automatic upshift.

19. The combination as set forth in claim 17 wherein said ratio changes comprise a change from a high gear ratio to a lower gear ratio thus effecting an automatic downshift.

20. The combination as set forth in claim 14 wherein said speed sensor means is adapted to develop a speed signal that is determinative of vehicle speed.

21. An automatic transmission for an automotive vehicle having a throttle controlled engine comprising:
a hydrokinetic torque converter with an impeller connected to said engine and a turbine;
multiple ratio gearing having a torque input member connected to said turbine, said gearing establishing multiple torque flow paths;
a converter lock-up clutch means for selectively connecting said impeller and said turbine to establish a mechanical torque flow path through said converter;
pressure operated clutches and brakes for establishing and disestablishing said torque flow paths, such establishment and disestablishment of said torque flow paths defining shift points;
an automatic ratio controlling valve system having shift control valve portions with interactive shift valve elements communicating with a pressure source and said clutch and brake means;
solenoid valve means in said valve system for distributing selectively to said shift control valve portions a fluid pressure actuating signal to actuate said shift valve elements between two pressure distribution positions;
an electronic processor having a memory portion, said memory portion including information storage registers, shift control information being stored in said storage registers, said information including functional relationships between throttle position and vehicle speed that determine said shift points;
means for sensing vehicle speed and throttle position communicating with said processor for developing ratio shift controlling signals for said solenoid valve means;

said processor including several discrete modules that are sequentially addressed including a module having means for addressing the information in said memory and establishing said shift controlling signals in a desired gear computation in response to a determination of the functional relationship between the values of sensed vehicle speed and throttle position;

said ratio changes being upshifts or downshifts depending upon the relative magnitudes of said ratio shift controlling signals;

manual valve means for manually selecting a pressure distribution pattern in said valve system whereby said shift control valve elements are conditioned for automatic torque ratio selection in any one of several ranges of ratios depending upon the magnitude of the vehicle speed and throttle position;

said processor including a sub-module that is addressed following a desired gear computation including means for selecting one of several sequences of shifts in a multiple step shift within the range of ratios selected by said manual valve means;

means for controlling the time required to perform a change in ratio in response to a variation in the magnitude of said shift controlling signals to effect optimum shift smoothness, said time controlling means establishing a shift time delay for each ratio step in a range of ratio changes including a multiple step ratio change;

means for controlling said converter to effect disengagement of said converter clutch following said computation of a desired gear when said desired gear computation indicates a downshift, and timer means for inhibiting re-engagement of said converter clutch until said downshift is completed.

22. The combination as set forth in claim 18 wherein said speed sensor means is adapted to develop a speed signal that is determinative of vehicle speed.

23. An electronic control system for a multiple ratio transmission for an automotive vehicle having a throttle controlled engine comprising gearing, pressure operated clutch and brake servos adapted to establish and disestablish multiple ratios, a pressurized valve system comprising a valve circuit having shift control valve elements that communicate with said servos, such establishment and disestablishment of said multiple ratios defining ratio shift points;
a hydrokinetic torque converter having an impeller connected to said engine and a turbine connected to a torque input member of said gearing;
a lockup clutch means for connecting said impeller and said turbine to establish a mechanical torque flow path through said torque converter;
solenoid valve means in said circuit for distributing selectively to said shift control valve elements a fluid pressure signal for activating the latter;
an electronic processor having a memory portion, said memory portion including information storage registers, said shift control information being stored in said storage registers, said information including functional relationships between throttle position and the vehicle speed that determine said shift points;
speed and throttle position sensor means communicating with said processor for developing ratio shift controlling signals for said solenoid valve means to effect a determination of as desired gear, said signals being established by said processor as the information in said memory is addressed and as a response to the determination of the functional relationship between the values of sensed speed and throttle position;

manual valve means for manually selecting a pressure distribution pattern in said manual circuit whereby said shift control valve elements are conditioned for automatic torque ratio selection in any of several ranges of ratios depending upon the magnitude of vehicle speed and throttle position;

means for controlling the time required to perform a change in ratio in response to a change in the relative magnitude of said signals to effect optimum shift smoothness, said time controlling means establishing shift delay values for each ratio shift in one of said ranges of ratios;

means for disengaging said lockup clutch upon a determination by said processor of a desired gear indicating a downshift from a current gear; and converter clutch delay timer means for delaying reengagement of said converter clutch until completion of said downshift.

24. A gear ratio shift control system for a multiple ratio vehicle transmission adapted to transfer driving torque from a throttle controlled combustion engine to a torque output member, a torque converter having an impeller connected to said engine, said transmission having gearing adapted to establish multiple torque delivery paths from said turbine to said output member, said gearing including gear elements adapted to transfer torque from said engine to said torque output member, said torque delivery paths being defined by said gear elements and having differing gear ratios including a direct drive ratio and at least one underdrive ratio;

clutch means for connecting together two elements of said gearing to establish direct drive operation;

brake means for anchoring one element of said gearing to establish said underdrive ratio;

fluid pressure operated clutch servo means and brake servo means for engaging said clutch means and said brake means, respectively;

said control system including a valve circuit with a regulated pressure source and multiple shift valve means for selectively distributing actuating pressure to each of said servo means, and shift solenoid valve means for developing signals to activate said shift valve means;

an electronic digital processor means for controlling said solenoid valve means, vehicle speed sensor means, engine torque sensor means and turbine speed sensor means in said system connected to said processor;

said processor means including means for establishing a calibrated time delay between the time of commanding of a ratio change from said direct drive ratio to said underdrive ratio as one of said servo means is activated and the time that another of said servo means is deactivated during a ratio change between said direct drive ratio and said underdrive ratio and means for terminating said time delay during a ratio transition following a ratio change command and before the effective final gear ratio for that ratio change is achieved.

25. A gear ratio shift control system for a multiple ratio vehicle transmission adapted to transfer driving torque from a throttle controlled combustion engine to a torque output member, a torque converter having an impeller connected to said engine, said transmission having gearing adapted to establish multiple torque delivery paths from said turbine to said output member, said gearing including gear elements adapted to transfer torque from said engine to said torque output member, said torque delivery paths being defined by said gear elements and having differing gear ratios including a direct drive ratio and at least one underdrive ratio;

clutch means for connecting two elements of said gearing together to establish direct drive operation;

brake means for anchoring one element of said gearing to establish said underdrive ratio;

fluid pressure operated clutch servo means and fluid pressure operated brake servo means for engaging said clutch means and said brake means, respectively;

said control system including a valve circuit with a regulated pressure source and multiple shift valve means for selectively distributing actuating pressure to each of said servo means, and shift solenoid valve means for developing signals to activate said shift valve means;

an electronic processor means for controlling said solenoid valve means, vehicle speed sensor means, engine torque sensor means and turbine speed sensor means in said system connected to said processor;

said processor means for establishing a calibrated time delay between the time of commanding of a downshift from said direct drive ratio to said underdrive ratio as said clutch servo means is released and the time that said brake servo means is applied during a downshift, and means for terminating said time delay during a ratio transition to said underdrive ratio following a downshift command and before the effective ratio during said transition is equal to said underdrive ratio.

26. The combination as set forth in claim 25 wherein said processor comprises a central processor unit having multiple information storage registers and means for sequentially addressing said registers in sequential background control loops, said central processor unit including means for continually monitoring during each background loop during a ratio transition the instantaneous ratio, and means for terminating said time delay when said instantaneous ratio equals the transmission gear ratio corresponding to the commanded gear ratio multiplied by a calibrated constant.

27. An automatic transmission control system for an automotive vehicle having a throttle controlled combustion engine and a multiple ratio transmission, said transmission having gear elements and fluid pressure operated clutch and brake means for controlling the relative motion of said gear elements to establish plural torque delivery paths between said engine and a driven member;

a valve circuit having a source of regulated fluid pressure in fluid communication with said clutch means and brake means, said clutch means and brake means being adapted to selectively control the relative motion of elements of said gearing to effect multiple driving torque ratios including a direct drive ratio and an underdrive ratio;

shift valve means in said circuit for controlling distribution of fluid pressure to said clutch and brake means, multiple solenoid operated valve means for establishing shift signals for actuating said shift valve means;

an electronic processor means for developing ratio shift control signals for activating and deactivating said solenoid operated valve means;

sensor means for developing electrical sensor signals that are a measure of vehicle operating variables including throttle position and vehicle speed;

said processor means being adapted to process information received from said sensor means and to develop said ratio shift signals for said solenoid operated valve means during repetitive background control loops whereby the processing of said information occurs in sequential order in a background control loop;

said multiple solenoid valve means being activated by said processor means whereby they assume on and off states in discrete patterns as they are selectively activated by said processor means, said solenoid valve means assuming a first activation pattern to effect said direct drive ratio and a second activation pattern to effect a downshift to said underdrive ratio;

said processor means being adapted also to process information received from said sensor means to develop said ratio shift signal for said solenoid operated valve means during repetitive foreground control loops with less cycle time than the cycle time required for said background control loops whereby transient activation patterns for said solenoid valve means are established during a ratio shift from said direct drive ratio to said underdrive ratio thereby controlling the rate of release of said clutch means and the rate of application of said brake means.

28. The combination as set forth in claim 27 wherein said clutch means is applied to effect direct drive operation and wherein said brake means is applied to effect underdrive operation, said clutch means having a fluid pressure actuating chamber and said brake means having a pressure actuating chamber and a pressure release chamber, said brake means being applied when its pressure actuating chamber is pressurized and being released when its actuating chamber is exhausted as its pressure release chamber is pressurized; and valve means for regulating the pressure in said pressure actuating chamber when said solenoid operated valve means assumes a first one of said transient activation patterns whereby the rate of application of said brake is modified during a downshift from direct drive ratio.

29. The combination as set forth in claim 28 wherein said valve circuit includes multiple fluid flow restricting control orifices in a fluid flow path communicating with said clutch means during said downshift and in a fluid flow path communicating with said pressure release chamber for said brake means; and means for controlling distribution of fluid pressure from said clutch means and said release chamber for said brake means through one of said orifices when said solenoid valve means assumes one of said transient activation pattern and for controlling distribution of fluid pressure from said clutch and said brake release camber through another of said orifices when said solenoid valve means assumes another of said transient activation patterns.

30. The combination as set forth in claim 27 wherein said valve circuit includes fluid flow restricting control orifices in a fluid flow path communicating with said clutch during said downshift and in a fluid flow path communicating with said brake pressure release chamber;

means for directing fluid pressure from said clutch and said brake release chamber through said orifices when said solenoid operated valve means assumes a second of said transient activation patterns whereby the ratio of application of said brake is modified.

31. The combination as set forth in claim 27 wherein said valve circuit includes multiple fluid flow restricting control orifices in a fluid flow path communicating with said clutch means curing said downshift and in a fluid flow path communicating with said pressure release chamber for said brake means;

means for controlling distribution of fluid pressure from said clutch means and said release chamber for said brake means through one of said orifices when said solenoid valve means assumes one of said transient activation pattern and for controlling distribution of fluid pressure from said clutch and said brake release camber through another of said orifices when said solenoid valve means assumes another of said transient activation patterns.

* * * * *